US012755570B2

(12) United States Patent
Bulatov et al.

(10) Patent No.: US 12,755,570 B2
(45) Date of Patent: Oct. 6, 2026

(54) UNIFIED FRAMEWORK FOR ANALYSIS AND RECOGNITION OF IDENTITY DOCUMENTS

(71) Applicant: Smart Engines Service, LLC, Moscow (RU)

(72) Inventors: Konstantin Bulatovich Bulatov, Moscow (RU); Pavel Vladimirovich Bezmaternykh, Moscow (RU); Dmitry Petrovich Nikolaev, Moscow (RU); Vladimir Viktorovich Arlazarov, Moscow (RU)

(73) Assignee: SMART ENGINES SERVICE, LLC, Moscow (RU)

( * ) Notice: Subject to any disclaimer, the term of this patent is extended or adjusted under 35 U.S.C. 154(b) by 486 days.

(21) Appl. No.: 17/971,190

(22) Filed: Oct. 21, 2022

(65) Prior Publication Data

US 2023/0132261 A1 Apr. 27, 2023

(51) Int. Cl.
*G06V 30/24* (2022.01)
*G06V 10/26* (2022.01)
(Continued)

(52) U.S. Cl.
CPC ............ *G06V 30/248* (2022.01); *G06V 10/26* (2022.01); *G06V 30/413* (2022.01); *G06V 30/414* (2022.01); *G06V 40/172* (2022.01)

(58) Field of Classification Search
CPC .... G06V 30/248; G06V 10/26; G06V 30/413; G06V 30/414; G06V 20/46; G06V 30/19013; G06V 30/418
See application file for complete search history.

(56) References Cited

U.S. PATENT DOCUMENTS 8,126,272 B2 * 2/2012 Carr ........................ G07D 7/005
382/284
9,373,030 B2 * 6/2016 van Deventer ...... G06V 30/414
(Continued)

FOREIGN PATENT DOCUMENTS

JP 6314332 B2 4/2018
RU 127977 U1 5/2013
(Continued)

OTHER PUBLICATIONS

АрПа$_з$аро$_В$ et al., Анализ особенностей использования стационарных и мобильных малоразмерных цифровых видео камер для распознавания документов ИНФОРМАЦИОННЫЕ ТЕХНОЛОГИИ И ВЫЧИСЛИТЕЛЬНЫЕ СИСТЕМЫ Mar. 2014, pp. 71-81.
(Continued)

*Primary Examiner* — Vu Le
*Assistant Examiner* — Zaid Muhammad Saleh
(74) *Attorney, Agent, or Firm* — Millen, White, Zelano & Branigan, P.C.; Jennifer L. King

(57) ABSTRACT

Unified framework for analysis and recognition of identity documents. In an embodiment, an image is received. A document is located in the image and an attempt is made to identify one or more of a plurality of templates that match the document. When template(s) that match the document are identified, for each of the template(s) and for each of one or more zones in the template, a sub-image of the zone is extracted from the image. For each extracted sub-image, one or more objects are extracted from the sub-image. For each extracted object, object recognition is performed. This may be done over one iteration (e.g., for a scanned image or photograph) or a plurality of iterations (e.g., for a video). Document recognition is performed based on the one or more templates and the results of the object recognition, and a final document-recognition result is output.

18 Claims, 5 Drawing Sheets

(51) Int. Cl.
*G06V 30/413* (2022.01)
*G06V 30/414* (2022.01)
*G06V 40/16* (2022.01)

(56) References Cited

U.S. PATENT DOCUMENTS

| | | | | |
|---|---|---|---|---|
| 10,354,142 | B2 | 7/2019 | Arlazarov et al. | |
| 2017/0330048 | A1* | 11/2017 | Kalyuzhny | G06V 30/147 |
| 2021/0124919 | A1* | 4/2021 | Balakrishnan | B42D 25/309 |
| 2022/0004755 | A1* | 1/2022 | Allen | G06V 30/12 |

FOREIGN PATENT DOCUMENTS

| | | | | |
|---|---|---|---|---|
| RU | 182557 U1 | | 8/2018 | |
| WO | WO-2018185574 A1 | * | 10/2018 | G03B 15/05 |

OTHER PUBLICATIONS

Li et al., "Document rectification and illumination correction using a patch-based Cnn," Acm Transactions on Graphics (TOG), vol. 38, No. 6, Article 168, Nov. 2019, pp. 1-11.
Asad et al., "High performance OCR for camera-captured blurred documents with LSTM networks," 2016 12th IAPR Workshop on Document Analysis Systems (DAS), IEEE, pp. 7-12.
Chernov et al., 'Оценка качества входных изображений в системах распознавания видеопотока, ИНФОРМАЦИОННЫЕ ТЕХНОЛОГИИ И ВЫЧИСЛИТЕЛЬНЫЕ СИСТЕМЫ Apr. 2017, 13 pages.
Nunnagoppula et al., "Automatic blur detection in mobile captured document images: Towards quality check in mobile based document imaging applications," 2013 IEEE Second International Conference on Image Information Processing (ICIIP-2013) Dec. 9, 2013, IEEE, pp. 299-304.
Miao et al., "Perspective rectification of document images based on morphology," 2006 International Conference on Computational Intelligence and Security, Nov. 3, 2006, vol. 2, IEEE, pp. 1805-1808.
Takezawa et al., "Robust perspective rectification of camera-captured document images," 2017 14th IAPR International Conference on Document Analysis and Recognition (ICDAR), Nov. 9, 2017, vol. 6, IEEE, pp. 27-32.
Ky$_{H}\varkappa_{H}$a et al., "СЛЕПАЯ КОМПЕНСАЦИЯ РАДИАЛЬНОЙ ДИСТОРСИИ НА ОДИНОЧНОМ ИЗОБРАЖЕНИИ С ИСПОЛЬЗОВАНИЕМ БЫСТРОГО ПРЕОБРАЗОВАНИЯ ХАФА," Компьютерная оптика, 2016, $_{ТОМ}$ 40, No. 3, pp. 395-403.
Zhukovsky et al., "Segments graph-based approach for document capture in a smartphone video stream," 2017 14th APR International Conference on Document Analysis and Recognition (ICDAR), Nov. 9, 2017, vol. 1, IEEE, pp. 337-342.
Haris et al., "Recurrent back-projection network for video super-resolution," Proceedings of the IEEE/CVF Conference on Computer Vision and Pattern Recognition 2019, pp. 3892-3901.
Petrova et al., "Weighted combination of per-frame recognition results for text recognition in a video stream," Компьютерная оптика, 2021, 45(1), pp. 77-89.
Awal et al., "Complex document classification and localization application on identity document images," 2017 14th APR International Conference on Document Analysis and Recognition (ICDAR), Nov. 9, 2017, vol. 1, IEEE, pp. 426-431.
Augereau et al., "Semi-structured document image matching and recognition," Document Recognition and Retrieval XX Feb. 4, 2013, vol. 8658, SPIE, pp. 13-24.
Slavin, "Using special text points in the recognition of documents," Cyber-Physical Systems: Advances in Design & Modelling 2020, Springer, Cham., 8 pages.
Minkina et al., "Generalization of the Viola-Jones method as a decision tree of strong classifiers for real-time object recognition in video stream," Seventh International Conference on Machine Vision (ICMV 2014), Feb. 14, 2015, vol. 9445, SPIE, pp. 233-237.
Puybareau et al., "Real-time document detection in smartphone videos," 2018 25th IEEE International Conference on Image Processing (ICIP), Oct. 7, 2018, IEEE, pp. 1498-1502.
Das Neves et al., "HU-PageScan: a fully convolutional neural network for document page crop," IET Image Processing, Dec. 2020, 14(15), pp. 3890-3898.
Loc et al., "Content Region Detection and Feature Adjustment for Securing Genuine Documents," 2020 12th International Conference on Knowledge and Systems Engineering (KSE), Nov. 12, 2020, IEEE, pp. 103-108.
Forman et al., "Secure Similar Document Detection: Optimized Computation Using the Jaccard Coefficient," 2018 iEEE 4th International Conference on Big Data Security on Cloud (BigDataSecurity), IEEE International Conference on High Performance and Smart Computing, (HPSC) and IEEE International Conference on Intelligent Data and Security (IDS), May 3, 2018, IEEE, pp. 1-4.
Skoryukina et al., "Real time rectangular document detection on mobile devices," Seventh International Conference on Machine Vision (ICMV 2014), Feb. 14, 2015, vol. 9445, SPIE, pp. 458-463.
Bulatov et al., "On optimal stopping strategies for text recognition in a video stream as an application of a monotone sequential decision model," International Journal on Document Analysis and Recognition (IJDAR), Sep. 2019, 22(3), pp. 303-314.
Povolotskiy et al., "Dynamic programming approach to template-based OCR," Eleventh International Conference on Machine Vision (ICMV 2018), Mar. 15, 2019, vol. 11041, SPIE, 8 pages.
Zhou et al., "East: an efficient and accurate scene text detector," 2017 IEEE Conference on Computer Vision and Pattern Recognition, pp. 2642-2651.
Wolf et al., "Object count/area graphs for the evaluation of object detection and segmentation algorithms," International Journal of Document Analysis and Recognition (IJDAR), Sep. 2005, 8(4), 28 pages.
Lee et al., "Tedeval: A fair evaluation metric for scene text detectors," 2019 International Conference on Document Analysis and Recognition Workshops (ICDARW), Sep. 22, 2019, vol. 7, IEEE, 7 pages.
Baek et al., "Cleval: Character-level evaluation for text detection and recognition tasks," Proceedings of the IEEE/CVF Conference on Computer Vision and Pattern Recognition Workshops 2020, 12 pages.
Bezmaternykh et al., "Textual blocks rectification method based on fast Hough transform analysis in identity documents recognition," Tenth International Conference on Machine Vision (ICMV 2017), Apr. 13, 2018, vol. 10696, SPIE, pp. 29-34.
Chernyshova et al., "Two-step CNN framework for text line recognition in camera-captured images," IEEE Access, vol. 3, Feb. 14, 2020, 14 pages.
Bulatov, "A method to reduce errors of string recognition based on combination of several recognition results with per-character alternatives," Bulletin of the South Ural StateUniversity. Ser. Mathematical Modelling, Programming & ComputerSoftware (Bulletin SUSU MMCS), 2019, vol. 12, No. 3, pp. 74-88.
Yujian et al., "A normalized Levenshtein distance metric," IEEE transactions on pattern analysis and machine Intelligence, Jun. 2007, vol. 29 No. 6, pp. 1091-1095.
Fiscus, "A post-processing system to yield reduced word error rates: Recognizer output voting error reduction (ROVER)," 1997 IEEE Workshop on Automatic Speech Recognition and Understanding Proceedings, Dec. 17, 1997, IEEE, pp. 347-354.
Arlazarov et al., "Method of determining the necessary number of observations for video stream documents recognition," Tenth International Conference on Machine Vision (ICMV 2017) Apr. 1, 20183, vol. 10696, SPIE, pp. 498-503.
Tolstov et al., "A modification of a stopping method for text recognition in a video stream with best frame selection," Thirteenth International Conference on Machine Vision Jan. 4, 2021, vol. 11605, SPIE, 9 pages.
Polevoy et al., "Choosing the best image of the document owner's photograph in the video stream on the mobile device," Thirteenth International Conference on Machine Vision Jan. 4, 2021, vol. 11605, SPIE, pp. 110-118.

(56) References Cited

OTHER PUBLICATIONS

Shi et al., "Real-time single image and video super-resolution using an efficient sub-pixel convolutional neural network," Proceedings of the IEEE conference on computer vision and pattern recognition 2016, pp. 1874-1883.
Ren et al., "Video super resolution based on deep convolution neural network with two-stage motion compensation," 2018 IEEE International Conference on Multimedia & Expo Workshops (ICMEW), Jul. 2, 20183, IEEE, pp. 1-6.
Mei et al., "Statistical learning for OCR text correction," arXiv preprint arXiv:1611.06950. Nov. 21, 2016, 10 pages.
Fang et al., "Fine-grained HTTP web traffic analysis based on large-scale mobile datasets," IEEE Access, Aug. 2, 2016, vol. 4, pp. 4364-4373.
Llobet et al., "OCR post-processing using weighted finite-state transducers," 2010 20th International Conference on Pattern Recognition, Aug. 23, 2010, IEEE, pp. 2021-2024.
БУЛАТОВ et al., "Универсальный алгоритм пост-обработки результатов распознавания на основе проверяющих грамматик," Труды ИСА РАН. PAH. Tom Apr. 2015, pp. 68-73.
Petrova et al., "Methods of machine-readable zone recognition results post-processing," Eleventh International Conference on Machine Vision (ICMV 2018), Mar. 15, 2019, vol. 11041, SPIE, 8 pages.
Bulatov et al., "Towards a unified framework for identity documents analysis and recognition," IEEE Access, vol. 0, 2021, pp. 1-18.
Arlazarov et al., "Analysis of the features of the use of stationary and mobile small digital video cameras for document recognition," Information Technologies and Computing Systems (ITiVS), No. 3, pp. 71-81, 2014.
Chernov et al., "Image quality assessment for video stream recognition systems," Informatsionnye Tekhnologii i Vychslitel'nye Sistemy, 2017, Issue 4, 71-82.
Kunina et al., "Blind Compensation for Radial Distortion in a Single Image Using the Fast Hough Transform," Computer Optics, vol. 40, No. 3, pp. 395-403, 2016, DOI:10.18287/2412-6179-2016-40-3-395-403.
Bulatov et al., "Universal algorithm for post-processing recognition results based on checking grammars," Trudy ISA RAN, vol. 65, No. 4, pp. 68-73, 2015.
Council of the European Union, "PRADO—Public Register of Authentic identity and travel Documents Online," retrieved Oct. 25, 2022, 10 pages.
Onfido, "Supported Documents." Oct. 25, 2022, 36 pages.
Line Eikvil, "Optical Character Recognition," DOI:10.3403/00116086uCorpus ID: 195901529, 1993, Computer Science, 35 pages.
Doermann et al., "Handbook of Document Image Processing and Recognition," Processing and Recognition, DOI 10.1007/978-0-85729-859-1, 2014, entire book.
International Civil Aviation Organization, "Machine Readable Travel Documents," Doc 9303, Part 1, vol. 2, Sixth Edition, 2006, entire book.
Hartl et al., "Real-time Detection and Recognition of Machine-Readable Zones with Mobile Devices," Proceedings of the 10th International Conference on Computer Vision Theory and Applications (VISAPP-2015), pp. 79-87.
Avoine et al., "ePassport: Securing International Contacts with Contactless Chips," Tsudik, G. (eds) Financial Cryptography and Data Security. FC 2008. Lecture Notes in Computer Science, vol. 5143. Springer, Berlin, Heidelberg. https://doi.org/10.1007/978-3-540-85230-8_11, pp. 141-155.
Buchmann et al., "A Preliminary Study on the Feasibility of Storing Fingerprint and Iris Image Data in 2D-Barcodes," 2016 International Conference of the Biometrics Special Interest Group (BIOSIG), 2016, pp. 1-5, doi: 10.1109/BIOSIG.2016.7736904, 5 pages.
H.C. Agrawal, "Aadhaar Enabled Applications," Application & Authentication Division, Unique Identification Authority of India, Dec. 2015, 28 pages.
ISO, "Identification cards—Physical characteristics," ISO/IEC 7810:2003, 1 page.
AAMVA, American Association of Motor Vehicle Administrators, "2020 AAMVA DL/ID Card Design Standard," Oct. 2020, Version 1.0, 125 pages.
Icao, "Security and Faciliation," Publication Date Unknown, Accessed on Oct. 17, 2022, 1 page.
Jumio, "Know Your Customer, No Matter Where They Are," Publication Date Unknown, Accessed on Oct. 17, 2022, 1 page.
Keesing Technologies, "Trusted identity verification. Since 1911." Publication Date Unknown, Accessed on Oct. 17, 2022, 1 page.
Lladós et al., "ICAR: Identity Card Automatic Reader," IEEE Xplore, DOI:10.1109/ICDAR.2001.953834, Feb. 2001, pp. 470-474.
Mollah et al., "Design of an Optical Character Recognition System for Camera-based Handheld Devices," IJCSI International Journal of Computer Science Issues, vol. 8, Issue 4, No. 1, Jul. 2011 ISSN (Online): 1694-0814, pp. 283-289.
Ryan et al., "An Examination of Character Recognition on ID card using Template Matching Approach," Procedia Computer Science 59 (2015), pp. 520-529.
Pratama et al., "Indonesian ID Card Recognition using Convolutional Neural Networks," IEEE, 2018 5th International Conference on Electrical Engineering, Computer Science and Informatics (EECSI), pp. 178-181.
Satyawan et al., "Citizen Id Card Detection using Image Processing and Optical Character Recognition," IOP Conf. Series: Journal of Physics: Conf. Series 1235 (2019) 012049 IOP Publishing, doi:10.1088/1742-6596/1235/1/012049, 7 pages.
Ray Smith, "An Overview of the Tesseract OCR Engine," Proc. Ninth Int. Conference on Document Analysis and Recognition (ICDAR), IEEE Computer Society (2007), pp. 629-633.
Attivissimo et al., "An Automatic Reader of Identity Documents," 2019 IEEE International Conference on Systems, Man and Cybernetics (SMC) Bari, Italy. Oct. 6-9, 2019, pp. 3525-3530.
Viet et al., "A Robust End-to-End Information Extraction System for Vietnamese Identity Cards," IEEE, 2019 6th NAFOSTED Conference on Information and Computer Science (NICS) Dec. 12, 2019, pp. 483-488.
Thanh et al., "A Method for Segmentation of Vietnamese Identification Card Text Fields," (IJACSA) International Journal of Advanced Computer Science and Applications, vol. 10, No. 10, 2019, pp. 415-421.
Sandler et al., "MobileNetV2: Inverted Residuals and Linear Bottlenecks," 2018 IEEE/CVF Conference on Computer Vision and Pattern Recognition, pp. 4510-4520.
Guo et al., "Attention-OCR," Publication Date Unknown, Accessed on Oct. 17, 2022, 1 page.
Xu et al., "A System to Localize and Recognize Texts in Oriented ID Card Images," IEEE, 2018, pp. 149-153.
Wu et al., "Identity authentication on mobile devices using face verification and ID image recognition," Procedia Computer Science 162 (2019), pp. 932-939.
Fang et al., "ID Card Identification System based on Image Recognition," 2017 12th IEEE Conference on Industrial Electronic and Applications (ICIEA), IEEE, 2017, pp. 1488-1492.
Castelblanco et al., "Machine Learning Techniques for Identity Document Verification in Uncontrolled Environments: A Case Study," MCPR 2020, LNCS 12088, pp. 271-281.
Arlazarov et al., "MIDV-500: a dataset for identity document analysis and recognition on mobile devices in video stream," Computer Optics 2019, 43(5), pp. 818-824.
Bulatov et al., "MIDV-2019: Challenges of the modern mobile-based document OCR," Twelfth International Conference on Machine Vision (ICMV 2019) Jan. 3, 20201 (vol. 11433), SPIE, 7 pages.
Skoryukina et al., "Fast method of ID documents location and type identification for mobile and server application," 2019 International Conference on Document Analysis and Recognition (ICDAR) Sep. 2, 20190, IEEE, pp. 850-857.
De Sá Soares et al., "BID Dataset: a challenge dataset for document processing tasks," Anais Estendidos do XXXIII Conference on Graphics, Patterns and Images Nov. 7, 2020, SBC, pp. 143-146.

(56) References Cited

OTHER PUBLICATIONS

Ngoc et al., "Saliency-based detection of identy documents captured by smartphones," 2018 13th IAPR International Workshop on Document Analysis Systems (DAS) Apr. 2, 20184, IEEE, pp. 387-392.
Chazalon et al., "SmartDoc 2017 video capture: Mobile document acquisition in video mode," 2017 14th IAPR International Conference on Document Analysis and Recognition (ICDAR) Nov. 9, 2017, vol. 4, IEEE, pp. 11-16.
Sencar et al., "Overview of state-of-the-art in digital image forensics, " Algorithms, Architectures and Information Systems Security, 2009, 21 pages.
Piva, "An overview on image forensics," International Scholarly Research Notices, 2013, 23 pages.
Centeno et al., "Identity Document and banknote security forensics: a survey," arXiv:1910.08993v1 [cs.CV] Oct. 20, 2019, 35 pages.
Ferreira et al., "A review of digital image forensics," Computers & Electrical Engineering. Jul. 1, 2020;85:106685, 9 pages.
Council of the European Union, "Public Register of Authentic Travel and Identity Documents Online," Prado, v. 11731/21, 2021, 149 pages.
Kunina et al., "A Method of Fluorescent Fibers Detection on Identity Documents under Ultraviolet Light," Research Gate, Dec. 2019, 8 pages.
Li et al., "Image Recapture Detection with Convolutional and Recurrent Neural Networks," Jan. 2017, Electronic Imaging 2017(7), pp. 87-91.
Sun et al., "Recaptured Image Forensics Algorithm Based on Image Texture Feature," International Journal of Pattern Recognition and Artificial Intelligence, vol. 34, No. 3 (2020) 2054011, 19 pages.
Warbhe et al., "A Scaling Robust Copy-Paste Tampering Detection for Digital Image Forensics," Procedia Computer Science 79 (2016), pp. 458-465.
Kumar, "Image Forensics Based on Lighting Estimation," International Journal of Image and Graphics, vol. 19, No. 3 (2019) 1950014, 11 pages.
ISO/IEC 1073-2, "Alphanumeric Character Sets for Optical Recognition—Part II: Character Set OCR-B—Shapes and Dimensions of the Printed Image," 1st Edition, Dec. 1, 1976, 15 pages.
Starovoitov et al., "Matching of Faces in Camera Images and Document Photographs," IEEE Xplore, Feb. 2000, Acoustics, Speech, and Signal Processing, 1988. ICASSP-88., 1988 International Conference, vol. 4, pp. 2349-2352.
Fysh et al., "Forensic face matching: A review," Face processing: Systems, disorders and cultural differences, Aug. 31, 2017, 4(6), pp. 1-20.
Bulatov et al., "Smart IDReader: Document recognition in video stream," 2017 14th IAPR International Conference on Document Analysis and Recognition (ICDAR) Nov. 9, 2017, vol. 6, IEEE, pp. 39-44.
Valentin et al., "Optical benchmarking of security document readers for automated border control," Optics and Photonics for Counterterrorism, Crime Fighting, and Defence XII Oct. 24, 2016, vol. 9995, SPIE, pp. 20-30.
Spigraph, "Document Scanners," Publication Date Unknown, Accessed on Oct. 17, 2022, 1 page.
Ambir, "A Scanner for Every Task," Publication Date Unknown, Accessed on Oct. 17, 2022, 1 page.

* cited by examiner

UNIFIED FRAMEWORK FOR ANALYSIS AND RECOGNITION OF IDENTITY DOCUMENTS

CROSS-REFERENCE TO RELATED APPLICATIONS

This application claims priority to Russian Patent App. No. 2021130921, filed on Oct. 22, 2021, which is hereby incorporated herein by reference as if set forth in full.

BACKGROUND

Field of the Invention

The embodiments described herein are generally directed to the processing of identity documents, and, more particularly, to a unified framework for the analysis and recognition of identity documents.

Description of the Related Art

"Optical character recognition" (OCR) is a widely used term that has become ambiguous. It originally denoted isolated character recognition that determined which character from a predefined alphabet is depicted in a given image region. According to Ref1, the first implementations of OCR were only able to handle a single alphabet in a single specific font. OCR that was capable of handling multiple alphabets and fonts appeared in the 1960s. The focus was in recognizing words or text fragments, rather than isolated characters. With the introduction of language models, the complexity of OCR increased, as OCR progressed from word recognition to whole-page processing and layout analysis. Many page-by-page OCR applications came into use, for example, in the digitization of books and papers and for check processing and postal recognition. The next step was to process structured documents, such as bank forms, invoices, questionnaires, tables, and the like.

As a consideration of the full document context became essential, the field of document image analysis was established. This field attracts a lot of attention, and relates to many disciplines, including image processing, pattern recognition, and language theory. Ref2 represents a consolidated source of expertise in this domain. In sum, at the present time, the term "OCR" primarily refers to document image analysis technology that enables various types of whole documents to be transformed into transferable, editable, and searchable data, and defines a process that is far beyond isolated character recognition.

Among a rich variety of document types, identity documents play a crucial role. OCR systems must either be tweaked, fine-tuned, or specifically designed to process identity documents, because a lot of specific information must be taken into account during their recognition and analysis. Such systems rely on both classical computer vision and document image analysis, as well as on recent advances in machine learning and deep learning.

An identity document is any document that can be used to confirm its owner's person and prove their identity. The document fields commonly contain various details about the owner, such as full name, date of birth, address, identification number, gender, photograph of the owner's face, an image of a personal signature, and the like. Some of these details are printed directly on the document, while others may be represented in a machine-readable zone (MRZ) (see Ref3 and Ref4) or encoded in a barcode format. Examples of identity documents include passports, drivers licenses, identification cards, and the like.

Identity documents may have a fairly simple layout, especially if there are not a significant number of fields. An example would be custom identity badges issued by an employer to its employees. However, in contexts with greater security concerns, the identity documents may be more complex. For example, government-issued identity documents are often equipped with visual security elements and special non-visible tags, such as radio-frequency identification (RFID) tags or microchips with biometric data (see Ref5). The emissions by such documents are strictly regulated by governmental and executive organizations. In addition, a unique national identification number is usually assigned to the owner and embedded into the identity document, frequently alongside biometric information, such as an iris print or fingerprint (see Ref6) or codes to access national biometric databases, such as India's Aadhaar document (see Ref7).

The most common type of identity document is an identification card, which often corresponds in physical dimensions to a regular bank card. A series of international standards exist that describe the characteristics of such documents. For instance, the International Organization for Standardization and the International Electrotechnical Commission (ISO/IEC) 7810:2003 (see Ref8) provides requirements for the physical features of an identity card. These standards became necessary due to widespread usage of identification cards in multiple countries, and aim to unify the characteristics of identification cards and facilitate the processing of identification cards. Another important type of identity document is a passport or other travel document. Passports are usually issued in the form of a booklet that is often equipped with an embedded microchip for machine reading.

The number of types of identity documents issued around the world is vast. Special databases have been constructed with exemplars of identity documents. Some of these databases are publicly available, such as the Public Register of Authentic Identity and Travel Documents Online (PRADO) (see Ref9). However, only a portion of the total variety of types of identity documents are covered by these databases. In addition, many countries are subdivided into states or other regions, which are allowed to issue their own sets of identity documents. For instance, each state in the United States issues its own drivers license, with the American Association of Motor Vehicle Administrators (AAMVA) managing unification and control of drivers licenses in the United States (see Ref10). Moreover, identity documents change from time to time, due to renewed designs and enhanced security requirements.

Automated systems have been developed for data entry from identity documents. From an industry perspective, these automated systems can be divided into three main groups. The first group is related to "offline" identity document processing. In offline processing, the owner of the identity document must be present with the identity document, so that an operator may verify the owner's identity. Offline processing may be used in opening a bank account, receiving medical services, registering for a room at a hotel, and the like. A significant subset of such cases comprises variations of physical standardized access control systems, in places where access is restricted or strongly regulated (e.g., government buildings, warehouses, etc.). Identity-document recognition systems allow the data entry and verification to be sped up and facilitate more efficient service provision and queue management.

The second group is remote identity verification, which is rapidly growing in many areas of customer service. This second group includes online banking and other financial services, online insurance services, remote government services, Know Your Customer (KYC) procedures, and the like. The physical presence of the owner of the identity document is not required, and the human operator can be omitted or can perform verification through digital channels. Remote identity-document verification is more comfortable for many clients, but presents additional challenges for identity-document recognition systems, as well as security and privacy concerns. To pass an authentication step, it is not sufficient to simply recognize the data from the identity document. Rather, attempts at identity fraud should be detected and prevented. With the spread of remote identity document processing in a broad range of services, the cost of false identification becomes very high.

The third group deals with traveler documents and combines the features of the first and second groups. Global international travel is monitored by government services, with officials from various countries checking and validating identity documents issued in other countries. Passing through border control and boarding an airplane, train, or other type of transport, and the like, are almost universally accompanied by the necessity to prove the passenger's identity. Remote identification processes are also generally introduced in such contexts. Generally, a large flow of travelers with identity documents from all over the world must be serviced quickly. Thus, the format of identity documents that are eligible for use during international travel is strictly regulated. In particular, the International Civil Aviation Organization Traveller Identification Programme (ICAO TRIP) was introduced specifically to enhance and regulate all aspects of traveler identification strategy (see Ref11). It comprises five elements: credible evidence of identity; design and manufacture of standardized machine-readable travel documents; document issuance and control; inspection systems and tools; and interoperable applications that provide for quick, secure, and reliable operations.

Most citizens hold several identity documents, each serving different purposes. To be scalable and usable within multiple processes, automated identity-document recognition systems should be prepared to process an enormous amount of documents types. While the total worldwide number of types of identity documents is hard to estimate exactly, remote identification service providers support 3,500 to 6,500 types of documents (see Ref12, Ref13, and Ref14). Thus, the design of an automated identity-document recognition system is constrained by the vast number of target document layouts, languages, national specifics, and document appearances. In addition, training data is limited, because personal information stored in identity documents cannot generally be published due to privacy and security concerns. Furthermore, progress in image-capturing devices and new types of optical scanners and digital cameras push these identity-document recognition systems to support more and more different types of image-capture methods (e.g., scans, photographs, video, etc.), as well as more challenging and uncontrolled image-capture conditions.

What is needed is a formulation and formalization of the methods and approaches to the recognition and analysis of identity documents, in order to facilitate both theoretical research and practical implementation of modern, robust, and scalable recognition systems.

SUMMARY

Accordingly, systems, methods, and non-transitory computer-readable media are disclosed for a unified framework for the recognition and analysis of identity documents.

In an embodiment, a method comprises using at least one hardware processor to: in each of at least one iteration, receive an image, locate a document in the image and attempt to identify one or more of a plurality of templates that match the document, when one or more templates that match the document are identified, for each of the one or more templates, for each of one or more zones in the template, extract a sub-image of the zone from the image, for each extracted sub-image, extract one or more objects from the sub-image, and, for each extracted object, perform object recognition on the object, and perform document recognition based on the one or more templates and results of the object recognition performed for each extracted object; and output a final result based on a result of the document recognition in the at least one iteration.

Each of the one or more templates that is identified as matching the document may be associated with a template recognition configuration and one or more geometric parameters representing one or more boundaries, within the image, of the document to which the template was matched, and the method may further comprise using the at least one hardware processor to, for each of the one or more templates, retrieve the associated template recognition configuration from a persistent data storage. Each template recognition configuration may define the one or more zones in the template, and, for each of the one or more zones, define the one or more objects within that zone.

The method may further comprise using the at least one hardware processor to, for each of the one or more templates, for each extracted sub-image, process the sub-image prior to extracting the one or more objects from the sub-image. Processing the sub-image may comprise correcting one or more geometric distortions.

The method may further comprise using the at least one hardware processor to, for each of the one or more templates, for each extracted object, process the object prior to performing object recognition on the object.

The method may further comprise using the at least one hardware processor to, when the image is a frame of a video that comprises a sequence of frames: in each of a plurality of iterations that are subsequent to the at least one iteration and prior to outputting the final result, receive one of the sequence of frames, locate the document in the frame and attempt to identify one or more of the plurality of templates that match the document, when one or more templates that match the document are identified in the frame, for each of the one or more templates, determine whether any of the one or more zones in the template satisfy a zone-level stopping condition in which all objects in the zone have satisfied an object-level stopping condition, extract a sub-image from the frame of each of the one or more zones in the template that have not satisfied the zone-level stopping condition, while not extracting a sub-image from the frame for any of the one or more zones in the template that satisfy the zone-level stopping condition, for each extracted sub-image, extract one or more objects from the sub-image, and perform object recognition on each extracted object that does not satisfy the object-level stopping condition, while not performing object recognition on any extracted object that does satisfy the object-level stopping condition, perform document recognition based on the one or more templates and results of the object recognition performed for each extracted object, and accumulate a result of the document recognition performed in the iteration with a result of the document recognition performed in one or more prior iterations, wherein the final result is based on the accumulated result of the document recognition in the plurality of iterations and the at least one iteration. The method may further comprise using the at least one hardware processor to add another iteration to the plurality of iterations until a recognition-level stopping condition is satisfied. The method may further comprise using the at least one hardware processor to, in each of the plurality of iterations, when one or more templates that match the document are identified in the frame, for each of the one or more templates, for at least one extracted object on which object recognition is performed, integrate a result of the object recognition performed for that object in the iteration with a result of the object recognition performed for that object in one or more prior iterations. The method may further comprise using the at least one hardware processor to, in each of the plurality of iterations, when one or more templates that match the document are identified in the frame, for each of the one or more templates, for at least one extracted object on which object recognition is to be performed, prior to performing the object recognition on that object, accumulate an image of that object with an image of the same object that was extracted in one or more prior iterations, wherein the object recognition is performed on the accumulated image of the object. At least one object may represent an optically variable device.

The at least one object may represent a text field. The at least one object may represent a photograph of a human face. The method may further comprise using the at least one hardware processor to verify an authenticity of the document based on the final result. The method may further comprise using the at least one hardware processor to verify an identity of a person, represented in the document, based on the final result. The one or more zones may consist of a single zone.

Extracting one or more objects from the sub-image may comprise segmenting the sub-image into the one or more objects according to a segmentation method. At least one of the one or more templates may comprise at least a first zone and a second zone, wherein the first zone is associated with a first segmentation method such that segmenting the sub-image of the first zone is performed according to the first segmentation method, wherein the second zone is associated with a second segmentation method such that segmenting the sub-image of the second zone is performed according to the second segmentation method, and wherein the second segmentation method is different from the first segmentation method.

The method may further comprise using the at least one hardware processor to: determine whether an input mode is a scanned image, photograph, or video; when the input mode is determined to be a scanned image or photograph, perform only a single iteration as the at least one iteration; and, when the input mode is determined to be a video, perform a plurality of iterations as the at least one iteration.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a unified framework for the analysis and recognition of identity documents. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. SYSTEM OVERVIEW

1.1. Infrastructure

Figure 1:
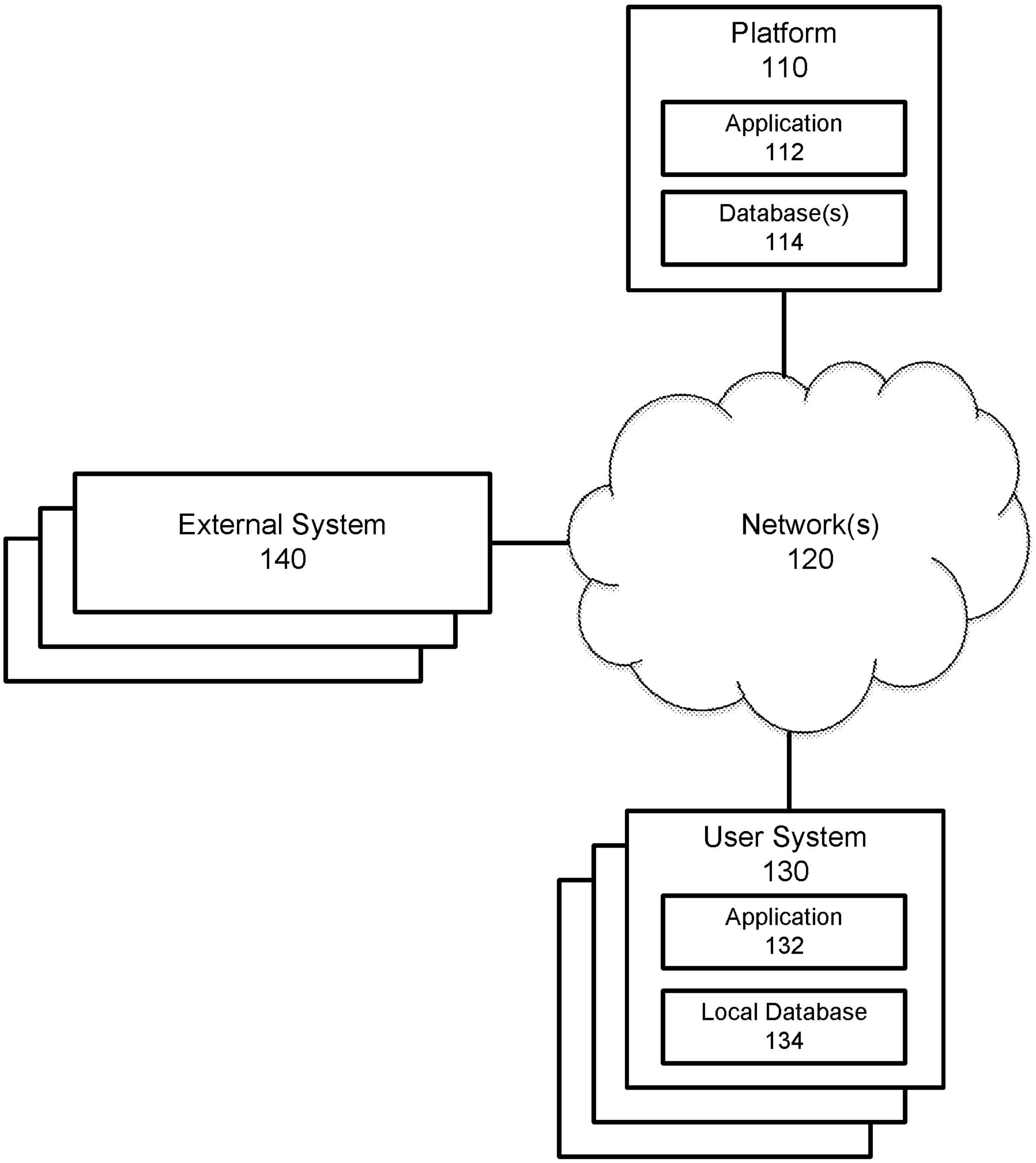
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, hand-held document scanners, sheet-fed document scanner, flatbed document scanners, game consoles, televisions, set-top boxes, electronic kiosks, point-of-sale terminals, Automated Teller Machines, and/or the like. It is primarily contemplated herein that user system (s) 130 will generally comprise any device that is capable of imaging an identity document, such as a smart phone, hand-held document scanner, sheet-fed document scanner, flatbed document scanner, and/or similar device. However, embodiments are not limited to these or any other particular type of imaging device.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the framework described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions of the unified framework described herein.

1.2. Example Processing Device

Figure 2:
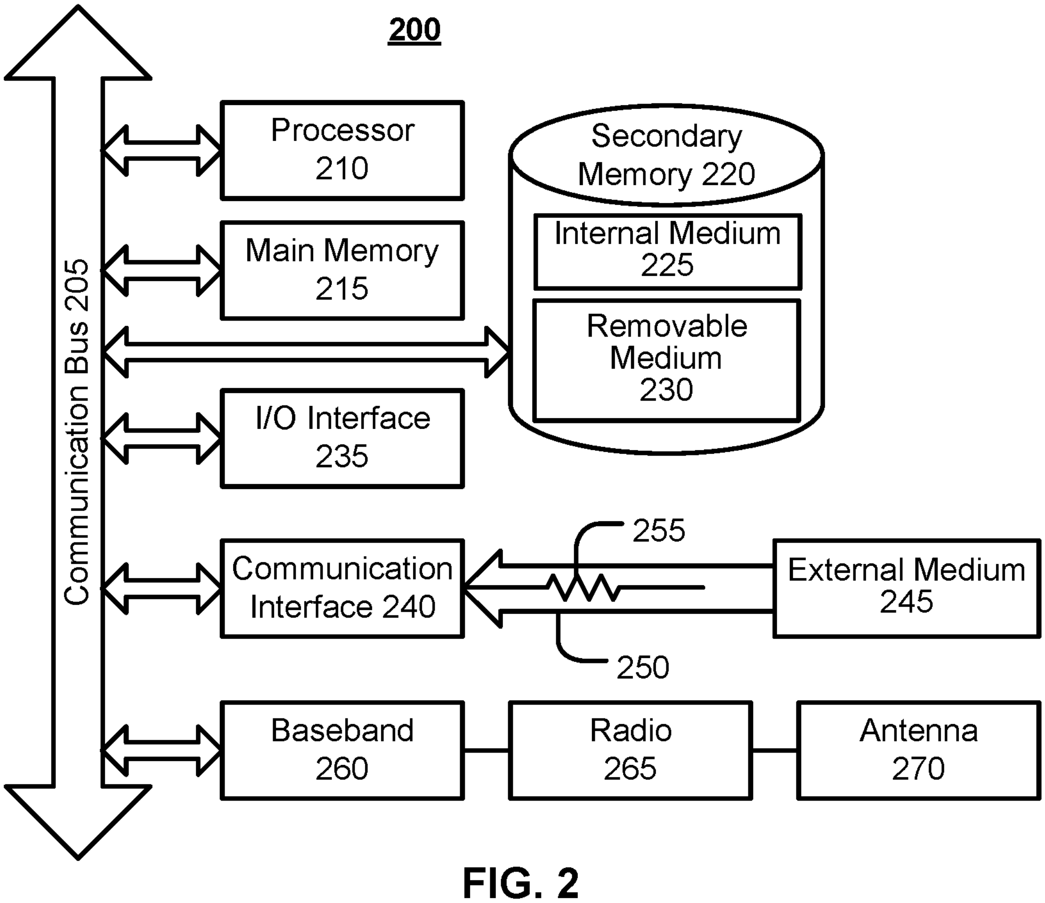
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute one or more software modules) of the unified framework described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 100 include, without limitation, the Pentium® processor, Core i7® processor, and Xeon® processor, all of which are available from Intel Corporation of Santa Clara, Calif., any of the processors (e.g., A series) available from Apple Inc. of Cupertino, any of the processors (e.g., Exynos™) available from Samsung Electronics Co., Ltd., of Seoul, South Korea, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs or software modules, such as those implementing the disclosed framework) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220

(including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs or software modules implementing the disclosed framework) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. PROCESS OVERVIEW

Embodiments of processes for a unified framework for the analysis and recognition of identity documents will now be described in detail. It should be understood that the described processes may be embodied in one or more software modules that are executed by one or more hardware processors (e.g., processor 210), for example, as a application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, implementations of the disclosed unified framework may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Introduction

The task of automatic data extraction from images of identity documents became a topic of research in the early 2000s, to facilitate more efficient data entry and verification of personal information, in scenarios such as checking into a hotel, boarding an airplane, and the like (see Ref15). At first, the primary modes of input were flatbed or specialized scanners. However, camera-based document recognition has become a topic of research in the past 10 years (see Ref16), due to the proliferation of portable digital cameras and mobile devices, such as smartphones.

Ref15 proposed the task of identity card recognition from images obtained using a flatbed scanner. The identity card was detected and de-skewed in the image using a Hough transform, and the document type was identified using color histogram classification. Text detection was performed using components analysis, and OCR was performed using binarized text images, followed by post-processing with geometric and linguistic context.

Ref17, Ref18, and Ref19 describe systems for recognition of Indonesian identity cards. The workflow in Ref17 is targeted at camera-captured identity documents, with processing steps that include scaling, grey-scaling, and binarization of the document images, extracting text areas using connected component analysis, histogram-based per-character segmentation of text lines, and template-based OCR. In Ref18, the characters of Indonesian identity cards were recognized using convolutional neural networks (CNNs) and support vector machines (SVMs) with pre-processing. The system described in Ref19 includes smoothing as one of the image pre-processing steps, morphological operations for detecting text fields, and utilization of Tesseract (see Ref20) for recognition of text lines. Ref21 describes a similar workflow with respect to camera-based recognition of various Italian identity documents, as a pre-processing step for document detection, and utilizes CNN-based classification of document type with vertices detection and analysis.

Ref22 and Ref23 describe systems for detection and recognition of text fields in Vietnamese identity documents. In Ref23, the pre-processing steps include grey-scaling, tilt correction, smoothing, and binarization. The text fields are separately detected with identity card number detection on one side of the document and table structure analysis on the other side of the document. Image pre-processing in Ref22 includes preliminary projective alignment of a camera-captured document image using corner detection, corner classification, and geometric heuristics. Single-Shot multibox Detection (SSD) MobileNet V2 (see Ref24) was used for text detection, and the Attention OCR architecture was used for recognition of text lines.

Ref26, Ref27, and Ref28 describe systems for recognizing camera-captured Chinese identity cards. The systems feature tilt correction using the Hough transform, document image pre-processing steps, such as brightness adjustment and grey-scaling, projections-based and morphology-based text detection, and text recognition using CNNs (see Ref26 and Ref27) or template-based and SVM-based OCR (see Ref28). In Ref26, the identification of document type uses national emblem detection that utilizes Ada-Boost-trained detection of Haar features.

Ref29 describes a system for analyzing identity documents that was evaluated on Colombian identity cards. The target goal of the workflow, described in Ref29, is authentication of the identity card. It includes deep-learning-based background removal, corners and contours detection for projective alignment, checking of brightness, color coherence, and aggregation greyscale histogram, and the use of face location, connected color components, and structural similarity markers for document authentication.

A crucial issue, related to the research of new methods and algorithms for the processing of identity documents, is the availability of public datasets. Since identity documents contain personal information, the existence of a public dataset of real identity documents is impossible. To facilitate reproducible scientific research, a number of synthetic datasets of identity documents have been developed. These include the Mobile Identity Document Video (MIDV) family of datasets (see Ref30, Ref31, and Ref32), which contains video clips of samples from fifty types of identity documents, obtained from public sources and captured under various conditions. Another example is the Brazilian Identity Document (BID) dataset (see Ref33), which contains images of Brazilian identity documents with blurred personal data and populated with synthetically generated fields. Some datasets were developed for the specific task of detecting identity documents, such as the École Pour l'Informatique et les Techniques Avancées (EPITA) Research and Development Laboratory (LRDE) Identity Document Image Database (IDID) (see Ref34). More broadly targeted datasets, available to the document analysis community, include the SmartDoc family (see Ref35), which features examples of identity documents.

Figure 3:
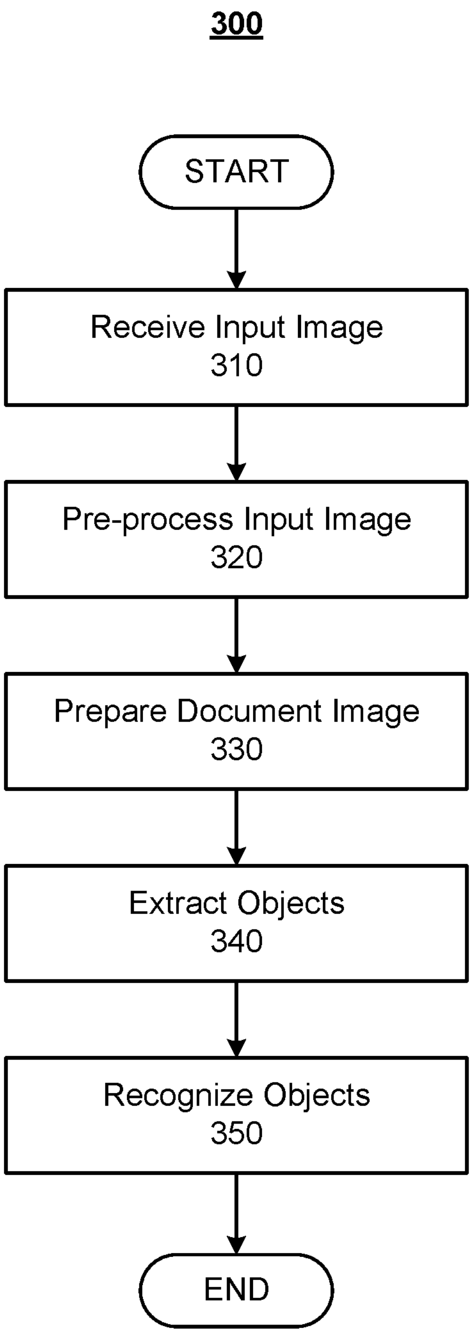
FIG. 3 illustrates the composition of a recognition process for identity documents, according to an embodiment.

While the methods used to perform the individual steps differ from system to system, the systems share a general composition. FIG. 3 illustrates the typical composition of a recognition process 300 for identity documents, according to an example implementation. In subprocess 310, an input image is received. In subprocess 320, the input image is pre-processed, which may comprise general image pre-processing steps, such as down-scaling, color scheme conversions, background removal, contour detection, edge detection, corner detection, semantic segmentation, and/or the like. In subprocess 330, the document image produced by subprocess 320 is prepared, which may comprise geometric rectification (e.g., tilt correction, projective restoration, etc.), brightness adjustment, and/or the like. In subprocess 340, objects, such as text fields and other important elements (e.g., facial photograph), are extracted from the document image prepared in subprocess 330. Finally, in subprocess 350, the objects that were extracted in subprocess 340 are recognized, which may comprise pre-processing (e.g., binarization, skew correction, etc.), per-character segmentation, recognition and post-processing using language models (e.g., for text fields), and/or the like.

It should be understood that the task of processing identity documents within automated systems is not limited to recognizing text fields. In addition to data extraction, an important aspect of identity-document processing is the validation of the document's authenticity, which refers to determining whether the document is genuine or counterfeit or at least detecting anomalies in the document image which may indicate malicious intent. This issue becomes more urgent with respect to remote identity verification, given the multitude of tools available for altering images or physical documents. This issue belongs to the field of digital image and document forensics, which is the subject of a separate branch of research (see Ref36, Ref37, Ref38, and Ref39). In general, the tasks for digital document image forensics can be divided into three types.

The first type of task confirms that the document contains the security features in the specification of the document type. The taxonomy of these security features, along with some examples, is described in the Public Register of Authentic Travel and Identity Documents Online (PRADO) glossary (see Ref40). Examples of security features include colored security fibers, rainbow coloring, guilloche, holograms, bleeding inks, and the like. The lack of such features helps reveal illicit usage of counterfeit documents or photocopied versions of fraudulently obtained real documents. Some security features, such as holographic security elements, may require video capture and processing for reliable analysis (see Ref41). Other features, such as colored security fibers, may require high quality input images or specific illumination for successful detection (see Ref42).

The second type of task is related to the identification and validation of the image source. An example of an impersonation attack during remote identity verification is the presentation of a recaptured image of an identity document. This topic has been extensively researched, and several approaches for detecting recaptured images have been proposed (see Ref43 and Ref44). Advanced image-editing software has made the task of editing or tampering with document images almost trivial. The availability of such tools means that identity document analysis should be able to detect the copying-and-pasting of image regions. Ref45 and Ref46 present some methods designed to detect impersonation attacks using recaptured document images. Ref47 describes another approach that is used to validate the source of a document image using estimation and lighting control.

The third type of task deals with analyzing the document content in order to reveal data manipulation. Designers of identity documents often introduce data duplication, which can be used to cross-check important text fields and validate their correctness. Some document fields, such as machine-readable zones, contain check digits (see Ref3) which should be verified. The usage of specific fonts, such as OCR-B (see Ref48), is required in many types of documents. Therefore, it is possible to validate font characteristics during document-image analysis.

Many identity documents contain a photograph of the document owner's face. Forensic face matching is a technology that is aimed at comparing the face depicted on an identity document to the face of the person presenting the identity document. While this technology has been around for a long time (see Ref49), recent advances in facial recognition have made it much more practical. Ref50 provides a review of forensic face matching.

Given the multitude of security features that are used to manufacture identity documents, and an increasing number of potential methods of attacking the presentation of identity documents within identity verification processes, a high-end identity-document recognition system today is virtually inconceivable without the application of digital-image forensics.

Published works on the composition of identity-document recognition primarily consider a subset of identity documents (e.g., document types that are specific to a particular country), focus on a single type of input data (e.g., only scanned images or only camera-based images), or do not consider additional tasks in identity-document image analysis (e.g., document forensics, anomaly detection, and authenticity validation). Ref51 describes a recognition system that recognizes identity documents in a video stream, with a per-frame combination of accumulated information. Such a system can be extended and revised with a goal of developing a unified framework for identity-document recognition and analysis. This unified framework should be applicable to multiple modes of image capture (e.g., scans, photographs, video, etc.), be scalable, and serve as the basis for developing new methods and algorithms that solve, not only recognition problems, but also the more sophisticated challenges of identity-document image forensics, automated personal authentication, and fraud prevention.

2.2. Input Characteristics

The task of identity-document recognition is affected by the mode in which the input images of documents are produced. Typical modes comprise scanner-captured images, camera-captured photographs, and camera-captured videos. It should be understood that a video comprises a sequence of images, sometimes referred to as "frames," that may be input to the identity-document recognition process as a video stream (e.g., in real time) or a video clip (e.g., captured in the recent or non-recent past). Thus, regardless of the input mode, the input to the identity-document recognition process is one or a plurality of images.

2.2.1. Scans

Traditionally, documents are digitized using various types of scanners, such as flatbed, sheet-fed, or specialized scanners (see Ref15 and Ref52). Flatbed scanners are used in many corporate and governmental contexts, in which speed is prioritized over the cost of the required hardware. Flatbed scanners are usually designed to scan documents with standard-sized pages (e.g., B5, A5, Letter, etc.). Thus, the resulting image is typically larger than required for identity-document processing. Since strict compliance with document positioning cannot be practically enforced, a comparatively small identity document (e.g., an identification card or passport) may be arbitrarily shifted or rotated in the scanned image. A class of specialized small-scale flatbed scanners exists for identity documents (see Ref53). However, even with these specialized flatbed scanners, the identity document may be shifted or slightly rotated when placed on the scanning surface. Thus, while the utilization of specialized flatbed scanners may impose additional constraints, the geometric model remains the same.

Sheet-fed scanners are typically used for batch scanning of multiple, separated pages. They offer increased scanning speed, but are rarely applicable to the task of identity-document processing. A separate class of sheet-fed scanners exist (see Ref54) that are designed to process identity cards and drivers licenses. While the time required to produce a high-resolution image from sheet-fed scanners is comparable to flatbed scanners, an important advantage of sheet-fed scanners over flatbed scanners is their ability to capture both sides of a card-like identity document. However, book-like identity documents cannot generally be captured using sheet-fed scanners, due to the risk of damaging the document.

A class of specialized identity-document scanners has been designed for scanning identity documents in cases of access control, border control, ticket sales or other self-service kiosks for purchasing age-restricted products, and the like (see Ref52, Ref55, Ref56, and Ref57). The primary motivation for this class of scanners is to reduce the time required to acquire the document image, while retaining high resolution and providing additional functionality, such as reading an RFID chip containing biometric information, capturing infrared document images or images under ultra-violet light, and the like. Such specialized scanners typically use a camera which enables quick acquisition of a high-resolution photograph of a document in controlled lighting conditions. The camera may either point directly at the scanning surface, point at the scanning surface through an angled mirror, or have an angular skew, depending on the particular method that is used, in order to minimize the effects of highlights, glares, and data obstruction (e.g., due to the holographic layer on an identity document).

Notably, one important problem that may be encountered in document-recognition systems that utilize scanned images is that the image resolution with respect to the captured document is not always known. For integrated systems, in which both the image-capture hardware and the image processing software are controlled, the image resolution is known and regulated. However, if the input images are obtained remotely or pre-processed by an uncontrolled party (e.g., in the case of images that are uploaded by a remote operator, end user, or service), the scale of the document might not be known in advance.

2.2.2. Photographs

The global leap in communications and mobile technologies and the increased demand for fast and convenient provision of services (e.g., government, banking, insurance, etc.) have led to the remote processing of document images that have been captured by end users and uploaded for processing. Not all end users have access to scanners, whereas mobile devices with cameras are readily available. The quality of such cameras enables the acquisition of document images that are of sufficient quality for at least human analysis.

This trend led to the need for automatic document recognition and analysis systems to support photographs as the input images (see Ref17, Ref21, and Ref26). The additional complications that are posed by photographic images, that are not similarly posed by scanned images, are quite numerous. Firstly, the background of a scanned image is typically homogeneous, whereas the background of a photographic image can be arbitrary. Different and uncontrolled backgrounds can be an obstacle to precise detection and localization of the document, especially when the background is cluttered, has many high contrast lines or local regions, or has text which may be confused with parts of the document by detection algorithms. Secondly, images acquired by a scanner are typically uniformly illuminated by an integrated lighting system designed to control the illumination, whereas user-captured photographs may have weak and inconsistent illumination and/or be overexposed or underexposed (see Ref58). Inconsistent lighting can present problems for detecting and localizing a document in an image, analyzing the document layout, recognizing text, and other aspects of automated document analysis (see Ref31 and Ref59). Thirdly, unlike scanned images, photographic images may be out of focus (see Ref60 and Ref61) and/or contain motion blur (see Ref62).

Perhaps the most important distinction between scanned images and photographic images is the geometric position of the document in the image. A small-scale document, such as an identification card or drivers license, may be rotated or shifted in a scanned image, but the family of geometric transformations of the document is limited to a subset of affine transformations. If the document was captured using a web camera or the camera of a mobile device, the document may be rotated along any of the three Euler angles with respect to the optical system. This could be unintentional or intentional (e.g., in an effort to prevent highlights on a reflective document surface). If a camera is modeled according to a pinhole model, the family of possible geometric transformations of the document is now a subset of projective transformations, which significantly complicates the task of precise document localization (see Ref63 and Ref64). There may even be several projective transformations for different parts of the document in a single image, such as in the case of capturing two open pages of a book-like document (e.g., a passport). Since the parameters of the camera lens may be unknown, the document images may also be affected by radial distortion (see Ref65). In addition, if the document is not rigid, it may be subject to deformations in the document's medium itself, such as the bending of papers pages in a passport.

2.2.3. Video Streams

The usage of web cameras and mobile devices to capture document images has led to another mode of input: a video comprising a sequence of images, instead of a single image (see Ref35). One of the advantages of using video is that it makes the input more resistant to tampering, since a video is harder to falsify than a photograph, especially when the document analysis is performed on a real-time video stream. In addition, multiple images of the same object presents several advantages for document recognition and analysis. In particular, filtering and refinement techniques can be employed to improve object detection and localization accuracy (see Ref32 and Ref66), "super-resolution" techniques can be employed to obtain higher quality images (see Ref67), and text recognition results can be improved by accumulating and combining recognition results from each video frame to produce a single reliable result (see Ref68).

A video may have the same scene geometries as a photograph. In particular, the document may be arbitrarily positioned and rotated along any of the three Euler angles with respect to the optical system. The document may also be placed against an arbitrary and uncontrolled background and/or be inconsistently illuminated or blurry (see Ref31). The geometric characteristics of the scene, along with image properties, such as blur, lighting, presence of highlights, and others, may change from frame to frame. The addition of a temporal axis to the input of the document-recognition system introduces redundancy that can be exploited in order to increase the quality of the automatic document analysis. In addition, if a video is regarded as a visual representation of an identity document, it can be used to identify document elements that may not be detectable in single photographs, such as holographic security elements and other optically variable devices (OVDs) (see Ref41). The processing of multiple video frames, with analysis of changes between consecutive video frames, is almost by definition the only way to accurately detect optically variable devices and distinguish them from printed color regions of a document.

2.3. Recognition Types

Figure 4:
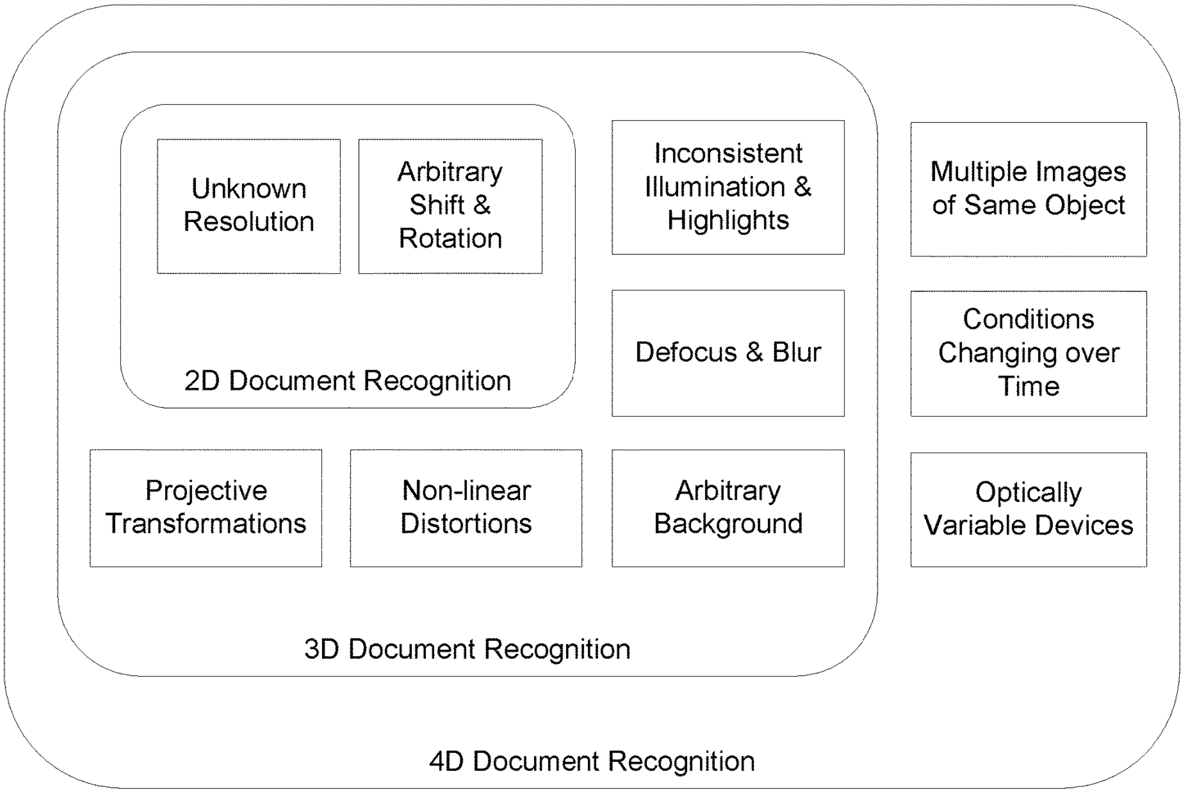
FIG. 4 illustrates potential characteristics of various input types, according to an embodiment.

An intuitive classification of the variations in document-recognition problems can be formulated based on the input characteristics described herein. In particular, the input type can be roughly described as either two-dimensional (2D) (e.g., scanned images), three-dimensional (3D) (e.g., photographs), or four-dimensional (4D) (e.g., video streams). FIG. 4 illustrates the various characteristics of each input type.

2D document recognition handles input images that have typically been obtained using scanners. In addition to the common subtasks of identifying visual document elements, analyzing the document layout, and recognizing text fields, 2D document recognition also needs to account for sometimes unknown image resolutions and arbitrary shifts and rotations of the document in the input image.

3D document recognition handles images that have typically been obtained using a web camera or the camera of a mobile device. In this case, the document-recognition system must analyze a three-dimensional scene, instead of a scanning surface. Thus, in addition to the subtasks required of 2D document recognition, 3D document recognition must account for projective transformations, non-linear distortions, arbitrary backgrounds, defocus and/or blur, inconsistent or inadequate illumination, and/or highlights on the reflective surface of the document in the input image.

4D document recognition handles video that comprises a plurality of images, instead of a single image. In this case, the document-recognition system must track the document over time as the image-capture conditions change across the plurality of images. 4D document recognition can exploit this redundancy in visual information to increase the reliability of the results of document analysis and recognition. Furthermore, the changing image-capture conditions may be utilized to detect and analyze optically variable devices, which are used extensively for identity document security.

Notably, there are specific cases that can be difficult to classify as either 2D, 3D, or 4D document recognition. One example is specialized video scanners (see Ref56), which use multiple frames in a 2D setting to exploit the differences between input images (e.g., originating from slight repositioning of the document on the scanning surface and/or from digital noise) to combine per-frame results and improve recognition accuracy. However, the described unified framework sensibly encompasses all such variations in input modes.

Despite different input modes, different models of a document's geometric position, and different sets of complications (e.g., presence of blur, highlights, uncontrolled lighting, etc.), the target of recognition (i.e., an identity document) remains the same in terms of structure and content. Thus, a unified framework for automatic data extraction from identity documents should account for the specifics of the supported target documents and apply to all input modes. The individual components of the unified framework and their interrelation to each other should allow for the support of a multitude of document types. In addition, by richer specification of individual components, the unified framework should allow for the introduction of sophisticated document-analysis methods, such as image forensics, into the processing pipeline.

2.4. Unified Framework

Embodiments will now be described of a unified framework for automated recognition of identity documents that may be captured in any of a variety of input modes. As used herein, the term "identity document" refers to any physical object that is designed and issued by a legitimate authority, according to a predefined set of rules and regulations, with the purpose of being carried by, and providing identification information for, a specific person. From the perspective of a document-recognition system, an identity document is regarded as a logical entity comprising a set of named fields and elements that each have a clear semantic meaning. The basic high-level component of visual document representation is referred to as a "template," which represents a planar rectangular document page or other substrate that is distinguishable by its static elements, such as background, immutable text, fiducial elements, national emblems, and/or the like, and the positions of these static elements on the substrate (see Ref69). Each template of the class of documents with fixed layouts, which may be referred to as "semi-structured" documents (see Ref70), may have the following three properties: (1) the positions and appearances of the static elements do not change between instances of the same template; (2) the collective positions and appearances of the static elements differ from those of other templates of the same document type, as well as from those of templates of different document types, and therefore, can be used to identify the template that corresponds to a document and the document type that the template represents; and (3) the template defines the set of objects (e.g., text fields, barcodes, signatures, facial photographs, etc.) that can be extracted from an image that is matched to the template, along with information about the locations and structure of those objects.

In an embodiment, the unified framework assumes that each input image includes a document of only a single type. If multiple templates are identified in a single input image that could each represent a separate page of the same document type (e.g., two pages of an open passport book), the unified framework can treat them as different pages of the same physical document. In addition, in the event that the input is a sequence of images (e.g., video), the unified framework may assume that all templates, visible across the entire sequence of images within a single recognition session, correspond to the same document.

Figure 5:
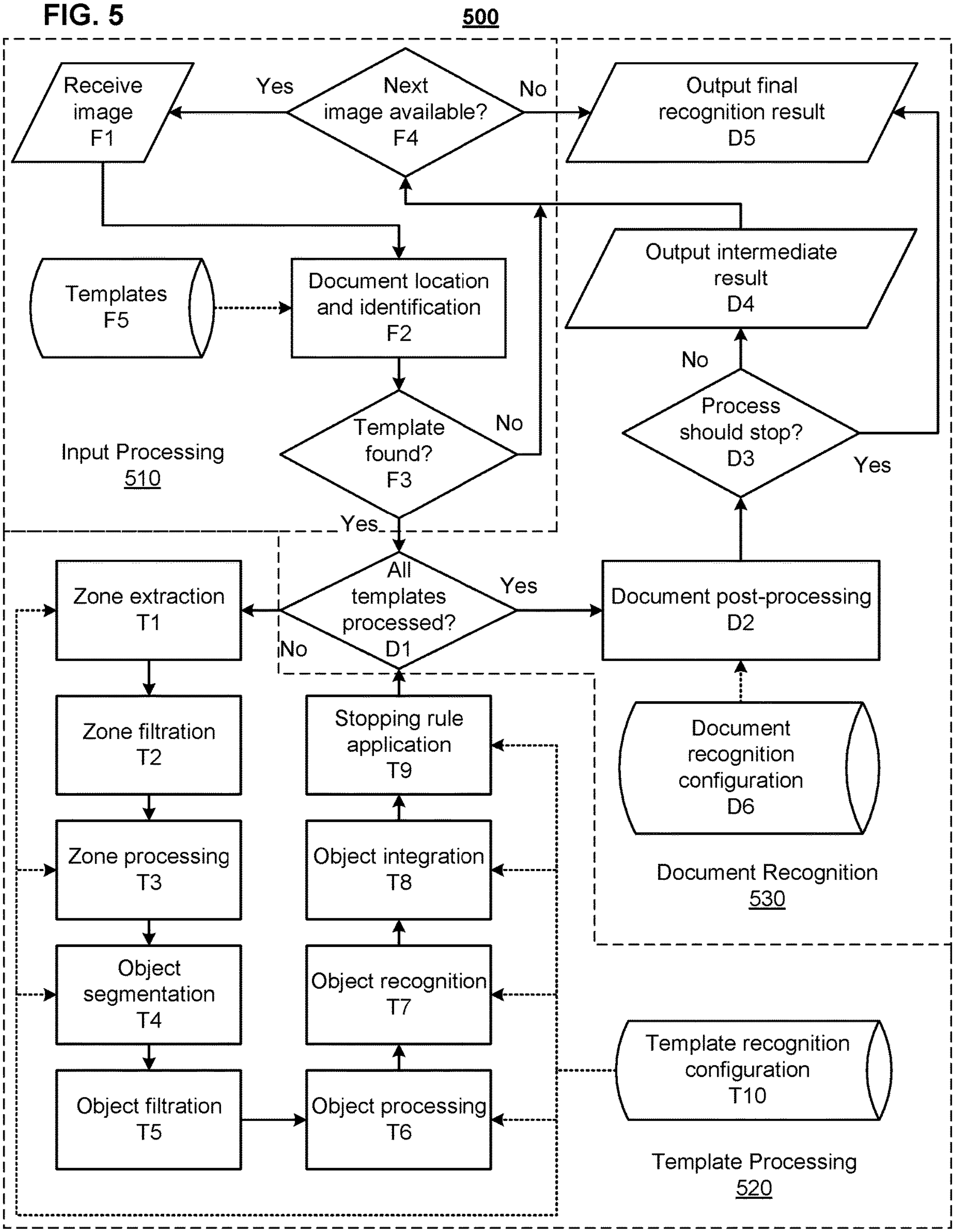
FIG. 5 illustrates the architecture of a unified framework for recognition of identity documents, according to an embodiment.

FIG. 5 illustrates the architecture of a unified framework 500 for recognition of identity documents, according to an embodiment. The components of unified framework 500 may be divided into three categories: input processing 510; template processing 520, and document recognition 530. Input processing 510 comprises the components which process input images (e.g., scanned images, photographic images, or video frames) with a goal of determining the coordinates of the documents within the input images (i.e., document localization) and finding all visible document templates (i.e., document identification). Template processing 520 comprises the components which process each individual document template that was found in input processing 510. Document recognition 530 comprises the components which collect the results of template recognition, in template processing 520, into logical representations of documents, perform post-processing, and output the results of document recognition.

In an embodiment, unified framework 500 has a persistently stored configuration that is designed to recognize identity documents from a predetermined set of document types. The configuration may be stored in persistent memory (e.g., database 114 for a server-based implementation, database 134 for a client-based implementation, secondary memory 220 of a particular system 200, etc.). This persistently stored configuration can be divided into three databases: a database F5 comprising a plurality of known document templates, with an index that is used during template location and identification in block F2; a database T10 of the recognition configuration (e.g., layout, constituent objects and their properties, and other data required for extraction and recognition of template components) for each of the plurality of known document templates in database F5; and a database D6 of the recognition configuration (e.g., how recognition results of individual templates are combined and post-processed to produce a final document-recognition result) for each document.

In block F1 of input processing 510, each input image is received or acquired. For example, an input image may be captured as a single image (e.g., scanned image or photograph) or as one in a sequence of images (e.g., a frame of a video).

In block F2 of input processing 510, database F5 of the known plurality of templates is used to locate the document in the input image and identify a template that matches the located document. In an embodiment, the focus of unified framework 500 is recognition of documents with fixed layouts. Thus, while some document location methods rely on preliminary text recognition (see Ref17 and Ref71), this embodiment of unified framework 500 is designed to utilize methods that locate documents by their overall visual representation in corresponding templates. Examples of such methods include those based on the Viola-Jones approach, which can be generalized as a decision tree of strong classifiers (see Ref72) and can be applied to document page detection and location that is robust to moderate perspective distortions, approaches based on detecting document boundaries (see Ref73), and deep-learning-based approaches that segment the document from the image background (see Ref74). A more universal method in this class of document localization methods utilizes template identification and matching based on feature points detection with indexing of descriptors and random sample consensus (RANSAC) refinement (see Ref70 and Ref75).

The formal problem statement of document location and identification in block F2 can be divided into two separate tasks: identification of the document template(s); and the location of the document in the input image i from the set of all possible images $\mathbb{I}$. To formalize the first task, database F5 of the plurality of known templates can be assumed to define a set $\mathbb{T}$ of template classes. Each class $t\in\mathbb{T}$ represents either a distinct document template or a set of templates that are allowed to be simultaneously visible in a single image. Given a dataset $D_{\mathbb{T}}=\{(i_1, t_1), (i_2, t_2), \ldots, (i_n, t_n)\}\subset\mathbb{I}\times\mathbb{T}$, the problem is to find a mapping $f_{\mathbb{T}}:\mathbb{I}\to\mathbb{T}$ that maximizes the classification accuracy:

$$\frac{100\%}{Card(D_{\mathbb{T}})}\cdot Card\{(i,t)\in D_{\mathbb{T}}\mid f_{\mathbb{T}}(i)=t\}\to\max_{f_{\mathbb{T}}}\qquad\text{Expression (1)}$$

wherein Card(·) represents the cardinal number of its input. For example, Card(x) represents the cardinal number of a set x.

The problem of locating the document is more complicated to formalize, since it implies a specific model of geometrically representing a template. If the real-world location target is a planar rectangular document template, under the general model of possible geometric distortions in a scanned or photographic image captured with a pinhole camera, the representation of a template in the image would be a quadrilateral or set of quadrilaterals (e.g., if multiple templates are visible in an image). The set of all possible location results (i.e., the set of all possible quadrilaterals for each template visible in the image) may be denoted as $\mathbb{G}$, with a metric function $$\rho_{\mathbb{G}}:\mathbb{G}\times\mathbb{G}\to\mathbb{R}_0^+.$$

Given a dataset $D_{\mathbb{G}}=\{(I_1, g_1), (I_2, g_2), \ldots, (I_n, g_n)\}\subset\mathbb{I}\times\mathbb{G}$, the problem is to find a mapping $f_{\mathbb{G}}:\mathbb{I}\to\mathbb{G}$ that minimizes the mean distance between the location of the found template(s) and the ground-truth location:

$$\frac{1}{Card(D_{\mathbb{G}})}\cdot\sum_{(I,g)\in D_{\mathbb{G}}}\rho_{\mathbb{G}}(f_{\mathbb{G}}(I),g)\to\min_{f_{\mathbb{G}}}\qquad\text{Expression (2)}$$

The metric function $\rho_{\mathbb{G}}$ can be defined in multiple ways, depending on the specifics of the problem, the desired result, and/or the specifics of the algorithms used in template processing 520. One of the most widely used metrics for document location is the Jaccard distance $d_J$, which is defined as:

$$d_J(A,B)=1-\frac{Card(A\cap B)}{Card(A\cup B)}\qquad\text{Expression (3)}$$

wherein A and B are regions of the image that are defined by sets of quadrilaterals $g_A, g_B\in\mathbb{G}$, and the cardinal numbers Card(·) of their intersection or union represent the areas of the corresponding shapes.

The Jaccard distance is used for locating identity documents in images, as well as locating other types of non-structured documents and arbitrary objects (see Ref74 and Ref76). While it is probably one of the most widely used metrics for document location, the Jaccard distance has some flaws. Firstly, a small shift of the quadrilaterals that are found is almost identical to incorrect detection of a single document corner, whereas these types of errors are significantly different with regards to rectangular documents with a fixed layout. After perspective restoration, the latter error would result in a much higher skew of the document content, which can lead to problems in the analysis and recognition of objects. Secondly, in terms of the Jaccard distance, there is no difference between a shift of the document boundaries outwards and a shift of the document boundaries inwards. However, the latter is worse for subsequent document analysis, since parts of the document content may be lost by an inward shift.

Thus, some algorithms for locating documents with fixed layouts use different definitions of the metric function. For example, the maximal discrepancy of the corner position may be used (see Ref77):

$$d_C(g_A,g_B)=\frac{\max_{(p_A,p_B)}\|p_A-p_B\|_2}{\min_{(p_{B_1},p_{B_2})}\|p_{B_1}-p_{B_2}\|_2}\qquad\text{Expression (4)}$$

wherein $(p_A, p_B)$ are pairs of the corresponding corners of the quadrilaterals represented by $g_A$ and $g_B$, and $(p_{B_1}, p_{B_2})$ are pairs of the corners belonging to the same quadrilateral represented by $g_B$, which corresponds to the ground truth.

The output of block F2 is a collection of one or a more document templates $t\in\mathbb{T}$ that were found in the input image acquired in block F1. Each found document template t is labeled to enable subsequent processing to determine the correct template recognition configuration, and is associated with geometric parameters $g \in \mathbb{G}$, such as the coordinates of its boundaries. If no document templates were found (i.e., "No" in block F3), the input image is rejected. When the input image is rejected, the document-recognition process ends with a null result in block D5 if there is only a single input image (i.e., "No" in block F4), or the next input image is received in block F1 if there is another input image (e.g., video frame) available (i.e., "Yes" in block F4). In terms of the formal problem statement, the null result can be represented as a separate template class $t_0 \in \mathbb{T}$, which corresponds to input images that do not contain any of the plurality of known document templates.

When the input to unified framework 500 is a sequence of images (e.g., video) and each image contains the same physical document, the document location and identification in block F2 may benefit from knowledge of the processing results from prior images in the sequence. Thus, block F2 may have access to non-persistent data storage (e.g., main memory 215 of the implementing system 200) that accumulates processing results from multiple input images acquired in a single document-recognition session (i.e., a single instantiation of unified framework 500).

After all discernible templates have been located and identified in the input image (i.e., "Yes" in block F3), each of the located and identified templates is processed by template processing 520, according to the parameters in the template recognition configuration stored in database T10 for each located and identified template. In template processing 520, since each template has been identified and its geometrical position in the input image has been determined, the position of most objects of interest within the document can be calculated, and the image of each individual object can be extracted with correction of any angular rotation, projective distortions, and the like. As used herein, the term "object" or "object of interest" may refer to any feature of a document that is represented in a template. Such features may comprise any static and/or dynamic elements, including, without limitation, fields (e.g., text fields), barcodes or other machine-readable zones, photographs (e.g., of the document owner's face), signatures (e.g., the document owner's signed name), stamps, optically variable devices (e.g., holograms) and/or other security features (e.g., colored security fibers, rainbow coloring, guilloche, bleeding inks, etc.), and/or the like. More generally, an object may comprise any feature of a document that is to be analyzed in template processing 520.

If the physical size of the document, corresponding to the template being processed, is known, the extracted image of each individual object can be generated with a specified spatial resolution (e.g., with a fixed number of pixels per inch). However, the actual resolution, in terms of the amount of information stored in each pixel, will depend on the resolution of the original image.

The exact knowledge, or at least a hypothesis, of the coordinates of the document, matched to a template, within an input image does not always mean that the exact coordinates of each object in the template are known. While the static elements of the template are at fixed positions, some objects, such as text fields, may have variable lengths and even variable positions. For example, in the template, there may be corresponding static labels and/or underlines to indicate where fields should be located. However, the position of each field, along the horizontal axis, may vary from document to document. In addition, due to printing defects, these fields may be shifted along the vertical axes, even in a manner that intersects with background lines, as well as have a slight angular skew.

This leads to the introduction of an intermediate entity that can represent a localized region of the template being processed and which can be used to locate individual objects. These regions may be referred to herein as "zones." A zone is a region of a template, with predefined coordinates, that can be processed by some predefined algorithm to segment the zone and extract individual objects of interest within the zone. A zone of a template may comprise a single object or a plurality of objects, depending on the complexity of the template, specifics of the objects, and specifics of the algorithm employed to extract the objects. In some cases, a zone may even correspond to the full template (e.g., if the template is relatively simple). A given template may consist of a single zone or comprise a plurality of zones.

It should be understood that each template processed by template processing 520 corresponds to a document located in block F2. In other words, each location in a template corresponds to a location in the input image received in block F1 within a document located in block F2. Thus, any reference herein to a location or zone in a template, that is being processed in template processing 520, may also be understood as a reference to the corresponding location or region in the input image or sub-image of the input image received in block F1.

In an embodiment, the first step of template processing 520 is the extraction of sub-images of each zone, in the current template being processed, in block T1. This extraction may be performed according to the information about zones and their positions encoded in the template recognition configuration that is stored and associated with the current template in database T10. Each zone that is specified in the corresponding template recognition configuration may define a set of individual objects to be extracted from the document region in the input image that corresponds to that zone in the template.

When the input is a video comprising a sequence of images, the extraction and/or recognition results for individual objects may be updated after each processed image in the sequence of images. In this case, it is important to automatically determine when the extraction and/or recognition processes should be stopped for each object (see Ref78). If the extraction process for a given object has been stopped, there is no need to extract the same object from future images in the sequence, since this would unnecessarily add to the processing time. Similarly, if all objects, within a given zone, have already satisfied their stopping conditions (e.g., as defined by stopping rules), the processing of the entire zone can be skipped for subsequent images in the sequence of images, thereby saving processing time. Thus, in block T2, after the set of zones of the current template have been extracted in block T1, any zone, for which all of the constituent objects have already satisfied their stopping conditions, is filtered out from further processing.

In block T3 of template processing 520, each image of a zone that was extracted in block T1 and was not filtered out in block T2 is processed. Block T3 may comprise operations such as detecting and correcting one or more geometric distortions (e.g., detection and rectification of angular skew), detection of specific security elements (e.g., holograms), suppression of background texture, and/or the like (see Ref19). While this image processing could be performed at the level of individual objects within each zone, instead of at that level of each zone, the reliability of such image-processing operations is frequently improved when the whole context of the zone is available. A good example of this a zone with objects (e.g., text fields) that have the same angular skew (e.g., due to a printing defect). While the angular skew could be determined at the level of each object, it can be beneficial to analyze the zone as a whole to obtain a more robust and consistent result.

In block T4 of template processing 520, each zone, as processed in block T3, may be segmented into the individual object(s) within the zone. In other words, one or more objects may be extracted from the sub-image for each zone that was extracted in block T1. The method of segmentation may vary from zone to zone, depending on each zone's structure. For example, some zones may have fixed local coordinates for each individual object, specified in its associated template recognition configuration. In this case, no additional searching is required. However, other zones may require a search for precise field coordinates using predefined patterns of fields (see Ref79) or even a search to detect free-form text (see Ref80). In these cases, similar quality metrics to those used for template location, such as Jaccard distance or other Intersection-Over-Union-based metrics (see Ref81), may be applied. Alternatively, similar quality metrics to those described below for independent analysis of text fields detection, given OCR results, such as character-level metrics Text Detector Evaluation (TedEval) (see Ref82) or Character-Level Evaluation (CLEval) (see Ref83), may be applied.

The output of block T4 may be a set of one or more named individual objects associated with their respective coordinates in their respective zones, as well as within the template and the input image. Similarly to the zones in block T2, when the input is a video, some of the objects, extracted from the zone(s) in block T4, may have already satisfied their stopping conditions in the recognition session. Thus, objects which have already satisfied their stopping conditions may be filtered out in block T5 from subsequent processing. Both of blocks T3 and T4 may have access to the non-persistent storage of the document-recognition session, in order to use the information gained at prior iterations of template processing 520 to increase the robustness of the zone analysis.

Subsequent steps of template processing 520 are related to analyzing individual objects. Firstly, in block T6, the images of individual objects of interest are pre-processed, with a similar motivation as the zones processing in block T3. Block T6 may include rectification of one or more specific features of each object, such as shearing of a text line (see Ref84). In addition, if the input to unified framework 500 is a video, block T6 may comprise accumulating images of objects obtained from prior frames that were processed during prior iterations. Then, in block T7, each individual pre-processed image of an object undergoes a recognition process to recognize the object, if required by the nature of the object. Notably, when an object undergoes recognition, the nature of the object is known beforehand (e.g., by virtue of the template recognition configuration for the template being processed). Thus, stored information about the language and specifics about the font (e.g., if the object is a text field), or stored information about other characteristics of the visual representation of an object, may be used to maximize the reliability and efficiency of the recognition in block T7.

While the task of recognizing objects, such as text fields, in a document might seem straightforward, a clear definition of what is considered the recognition result and a quality metric for the recognition result must be defined, in order to formalize the problem. Given a rectified image of an object $i \in \mathbb{I}$, the recognition algorithm can be denoted as a mapping $f_{\mathbb{X}}: \mathbb{I} \to \mathbb{X}$, in which $\mathbb{X}$ represents the set of all possible recognition results. For text fields, the most common option is to use the set of possible character strings to represent $\mathbb{X}$. However, for some applications, and to enable further processing of recognition results, the text recognition results may also be represented as sequences of character-level recognition results, in which each character recognition result maps a predefined alphabet to a set of character membership estimations (see Ref85 and Ref86). Given a dataset, comprising images of objects, with ground truth $D_{\mathbb{X}} = \{(i_1, x_1), (i_2, x_2), \ldots, (i_n, x_n)\} \subset \mathbb{I} \times \mathbb{X}$, the task of recognizing the objects is to find a mapping $f_{\mathbb{X}}$ that minimizes the mean distance between the recognition results and the ground truth, according to a predefined metric function $$\rho_{\mathbb{X}} : \mathbb{X} \times \mathbb{X} \to \mathbb{R}_0^+,$$

similar to Expression (2) for locating document templates:

$$\frac{1}{Card(D_{\mathbb{X}})} \cdot \sum_{(i,x) \in D_{\mathbb{X}}} \rho_{\mathbb{X}}(f_{\mathbb{X}}(i), x) \to \min_{f_{\mathbb{X}}} \qquad \text{Expression (5)}$$

A simple metric $\rho_{\mathbb{X}}$ for evaluating the quality of recognition results for text fields is an end-to-end comparison of string results, with which the mean distance on the dataset $D_{\mathbb{X}}$ (i.e., Expression (5)) corresponds to the rate of incorrectly recognized input fields:

$$\rho_E(x_1, x_2) = \begin{cases} 0 & \text{if } x_1 = x_2 \\ 1 & \text{if } x_1 \neq x_2 \end{cases} \qquad \text{Expression (6)}$$

Metrics that are more oriented to character-level evaluation include Levenshtein distance (i.e., the minimum number of insertions, deletions, and substitutions required to convert a first string to a second string), per-character recognition rate (see Ref85), normalized Levenshtein distance (see Ref 87), and others. Notably, the Levenshtein and normalized Levenshtein distances can be generalized for the representation of recognition results $\mathbb{X}$ with character membership estimations (see Ref86 and Ref87).

If the input to unified framework 500 is a video, the recognition results are combined into an integrated recognition result in block T8. Then, in block T9, a stopping condition is applied for each object to determine whether or not additional observations of that object are necessary. For example, block T9 may utilize the stopping condition described in U.S. patent application Ser. No. 17/180,238, filed on Feb. 19, 2021, and titled "Approximate Modeling of Next Combined Result for Stopping Text-Field Recognition in a Video Stream," which is hereby incorporated herein by reference as if set forth in full. Blocks T8 and T9 may utilize the non-persistent storage of the document-recognition session to read and update the current state of the video analysis.

The problem of combining recognition results for an object, given a sequence of images of the object and their respective recognition results, can be formalized as the problem of finding a family of mappings $c^{(k)}: \mathbb{X}^k \to \mathbb{X}$, in which k represents the number of per-frame recognition results in the sequence of images. Given a dataset of sequences of images of n objects $D_{\mathbb{X}^k} = \{(I_{11}, \ldots, I_{1k}, x_1),$ $(I_{21}, \ldots, I_{2k}, x_2), \ldots, (I_{n1}, \ldots, I_{nk}, x_n)\} \subset \mathbb{I}^k \times \mathbb{X}$, the task is to find a combination method $c^{(k)}$ that minimizes the mean distance between the combined result and the ground truth:

$$\frac{\sum_{(I_1,\ldots,I_k,x)\in D_{\mathbb{X}^k}} \rho_{\mathbb{X}}\left(c^{(k)}\left(f_{\mathbb{X}}(I_1), \ldots, f_{\mathbb{X}}(I_k)\right), x\right)}{Card\left(D_{\mathbb{X}^k}\right)} \to \min_{c^{(k)}} \quad \text{Expression (7)}$$

wherein $f_{\mathbb{X}}$ is the recognition method and $\rho_{\mathbb{X}}$ is the metric function on the set of recognition results, which both correspond to the recognition problem expressed in Expression (5). Combination methods include, without limitation, Recognizer Output Voting Error Reduction (ROVER) (see Ref88) and its extension for text-recognition results with per-character alternatives (see Ref86). Even simple selection strategies, such as selecting a single recognition result for the input image with the maximum quality or selecting a single recognition result having the maximum confidence level (see Ref68), can be considered a combination method. In an embodiment, the combination of object recognition results may performed in the manner described in U.S. patent application Ser. No. 17/180,434, filed on Feb. 19, 2021, and titled "Text Recognition in a Video Stream Using a Combination of Recognition Results with Per-Character Weighting," which is hereby incorporated herein by reference as if set forth in full.

To formalize a problem statement for the application of the stopping condition in block T9, a notion of observation cost may be introduced. The cost of acquiring k observations of an object, which includes acquiring images $I_1, I_2, \ldots, I_k$, pre=processing the acquired images, and performing recognition on the pre=processed images, may be denoted as $\gamma_k(I_1, I_2, \ldots, I_k)$, in relation to the potential recognition error of the combined recognition result $c^{(k)}(f_{\mathbb{X}}(I_1), \ldots, f_{\mathbb{X}}(I_k))$. In the simplest terms, the observation cost can be expressed as the number of processed frames k, or, in a more general case, the time or computational resources required to acquire the images and recognize the objects in the acquired images. The total loss after acquiring and processing k images of an object can be expressed as:

$$L_k(I_1, I_2, \ldots, I_k, x) = \rho_{\mathbb{X}}\left(c^{(k)}\left(f_{\mathbb{X}}(I_1), \ldots, f_{\mathbb{X}}(I_k)\right), x\right) + \gamma_k(I_1, I_2, \ldots, I_k) \quad \text{Expression (8)}$$

wherein x is the ground-truth value of the recognized object.

The stopping condition defines a stopping time or stopping frame K, which can be considered a random variable whose distribution depends on the observations $I_1, I_2, \ldots$. The stopping problem implies minimization of the expected loss at stopping time K:

$$E\left(L_K(I_1, I_2, \ldots, I_K, x) \,\middle|\, D_{\mathbb{X}^k}\right) \to \min_K \quad \text{Expression (9)}$$

wherein $E(\cdot)$ represents an expected value, $D_{\mathbb{X}^k}$ represents a dataset of a sequence of images of an object, and the sample space of K is the set $\{1, 2, \ldots, k\}$ of all possible stopping points. The simplest stopping condition stops the recognition process after a fixed number of observations have been processed. However, more effective approaches exist, such as thresholding of the maximum cluster of identical results (see Ref89), modeling of the combined recognition result at the next stage of the recognition process (see Ref78), and the like.

It should be understood that non-text objects, such as personal signatures or photographs, can also undergo the integration process in block T8. For example, for non-text objects, block T8 can select a single best image of the non-text object, by analyzing the focus score (see Ref68 and Ref90), consistency of illumination or the presence of highlights (see Ref91), and/or the like. Alternatively, the sub-images of objects extracted from the input image frames may be combined into a single image of higher quality using methods of video super-resolution (see Ref92 and Ref93). Optically variable devices, such as holographic security elements, may be analyzed in block T8 to verify that their variations between image frames are consistent and correspond to how a true optically variable device should behave. Notably, it may be feasible to use techniques, such as video super-resolution, to combine the sub-images of objects prior to their recognition. In this case, blocks T7 and T8 may be switched in order, such that recognition is performed in block T7 after the integration in block T8.

Notably, an object-level stopping condition is applied in block T9 for each object that is processed, and a zone-level stopping condition is applied in block T2 for each zone that is processed. This enables a mathematical optimization to be performed for stopping the recognition of individual objects without influencing other blocks of unified framework 500. For example, the zone-level stopping condition may be satisfied for a given zone when the object-level stopping condition has been satisfied for all objects within that given zone. Thus, if an object satisfies the object-level stopping condition in iteration i, this same object will no longer be processed in any subsequent iterations (i.e., i+1, i+2, and so on), since further processing will not significantly improve the result. Furthermore, if all objects in a zone have satisfied their object-level stopping conditions in iteration j, this same zone will no longer be processed in any subsequent iterations (i.e., j+1, j+2, and so on). Advantageously, the utilization of these two levels of stopping conditions improves efficiency and reduces computational time. To further improve efficiency, all information about the object(s) within a zone, including which objects have satisfied their object-level stopping conditions, may be contained within or associated with the representation of the zone, such that, after a given zone is extracted, all of this information about the object(s) is easily retrievable.

After all individual templates have been processed in template processing 520 (i.e., "Yes" in block D1), the found document(s), composed of those template(s), are collected by document recognition 530. The document recognition configurations stored in database D6, comprise information on known document types, their constituent templates, and the sets of objects expected in the document.

The final stage of document analysis is post-processing in block D2. The text fields of identity documents usually have a specific syntactic and semantic structure that is known in advance. Such structure typically comprises the following components:

- Syntax: rules that regulate the structure of text fields. For example, a "birth date" field in a machine-readable zone of an international passport may consist of six characters, which can each take one of only eleven possible values (i.e., ten decimal digits and a filler character).
- Field Semantics: rules that represent a semantic interpretation of the text field or its constituents. For example, a "birth date" field in a machine-readable zone of an international passport may be written in a fixed format "YYMMDD", in which "YY" is the last two digits of the year, "MM" is the month, and "DD" is the day. Unknown components of the date are filled with filler characters "<<".

Semantic Relationships: rules that represent the structural or semantic relationships between different fields of the same document. For example, in a valid document, the value of the "issue date" field cannot represent a moment in time that precedes the moment in time represented by the value of the "birth date" field.

Given the information about the syntactic and semantic structure of a text field, a language model can be built in the form of a mapping $$\lambda : \mathbb{X} \rightarrow \mathbb{R}_0^+$$

from the set of all possible recognition results to the set of real-valued language membership estimations. In terms of data structure, the language model λ can be represented as a dictionary, finite-state automaton, validation grammar (e.g., based on a text-field validity predicate), N-gram model, or the like (see Ref94 and Ref95). The problem statement for correcting language-dependent recognition results, based on a combination of hypotheses encoded in the text-field recognition result $f_{\mathbb{G}}$ (I), the language model λ, and the error model, is presented in Ref96 using Weighted Finite-State Transducers (WFSTs). Ref97 and Ref98 describe an alternative approach based on representing the language model λ as a validation grammar with a custom predicate.

If the input to unified framework 500 is a video stream, after document post-processing in block D2, in block D3, a final decision is made as to whether or not the full document-recognition result should be considered terminal, such that document recognition 530 should be stopped. This decision may be influenced by the stopping conditions for the individual objects (i.e., applied in block T9) and the presence of required document templates and required objects in the current document-recognition result. If the document-recognition result is determined to be terminal (i.e., "Yes" in block D3), this document-recognition result is output as the final recognition result of unified framework 500. Otherwise, if the document-recognition result is not determined to be terminal (i.e., "No" in block D3), the entire process repeats itself starting with acquisition of the next image frame in block F1. In addition, the intermediate result may be returned to the calling function in block D4 for visualization and external control purposes.

2.5. Universality of Unified Framework

Unified framework 500 is designed to support each of 2D, 3D, and 4D recognition. 2D recognition is complicated by potentially unknown input resolution and/or arbitrary shifts and rotation of document pages. However, these issues are handled in the first stages of unified framework 500. In particular, local zones and objects are analyzed (template processing 520) after the location and identification of the document templates (block F2). Thus, the analysis of template processing 520 is performed on rectified and correctly scaled images.

3D recognition is complicated by projective transformations, non-linear distortions, and/or arbitrary backgrounds. These issues are also handled by the location and identification of the document templates in block F2, prior to template processing 520. In addition, the issues of defocus, blur, highlights, and/or inconsistent illumination, which characterize 3D recognition, are addressed by zone processing in block T3 and object processing in block T6. Notably, blocks T3 and T6 are separate from other components, since the image processing in these blocks can either help analyze complex cases or perform an early rejection of an input having bad quality. Furthermore, even with images of objects that are blurry and inconsistently illuminated, block T7 is able to perform recognition and forensic analysis based on prior knowledge of the nature of the target object, since block T7 is always performed after the document template has been classified and the target zone or target object has been identified (e.g., via the template recognition configuration associated with the template in database T10).

In 4D recognition, unified framework 500 accounts for changes, over time, in the capture conditions in the individual processing stages, by having access to non-persistent storage during each document-recognition session, such that the extraction results from prior image frames are available during extraction of a current image frame. Integration in block T8 can increase the expected recognition accuracy of objects by using information from multiple image frames, and enables the analysis of optically variable devices. In addition, the application of stopping conditions in block T9 enables a reduction in the number of observations that are processed, and the filtering in blocks T2 and T5 saves time by skipping objects which no longer need to be analyzed in subsequent image frames.

3. EXAMPLE IMPLEMENTATIONS

Unified framework 500 may be implemented on a single system (e.g., system 200) or across a plurality of systems (e.g., two systems 200). For example, in a single-system embodiment, all blocks of unified framework 500 may be implemented as server application 112, hosted and executed entirely on platform 110, with databases F5, T10, and D6 stored in database 114. In this case, input images may be received from one or more user systems 130 over network(s) 120. Alternatively, all blocks of unified framework 500 may be implemented as client application 132, executed entirely on user system 130, with databases F5, T10, and D6 stored in local database 134. In this case, input images may be acquired via an integrated or connected camera of user system 130.

In a multi-system embodiment, unified framework 500 may be distributed across two or more systems. For example, some blocks may be performed by server application 112 on platform 110, while other blocks are performed by client application 132 on user system 130. As another example, all tasks may be performed by client application 132 on user system 130, while one or more of databases F5, T10, and D6 are stored in database 114 on platform 110, with data retrieved, as needed, from these database(s) by client application 132 over network(s) 120. It should be understood that the hosting and execution of various blocks may be divided between client application 132 and server application 112 in any suitable manner, as dictated by the particular design goals, with any necessary communications performed between client application 132 and server application 112 over network(s) 120 using standard communication protocols.

4. INDUSTRIAL APPLICABILITY

The development of modern identity-document recognition systems touch multiple disciplines of computer science, including image processing, image analysis, pattern recognition, computer vision, information security, computational photography, and optics. Societal and industrial challenges imposed on such systems require the development of methods for solving particular sub-tasks of identity-document analysis, such as text recognition and document detection, and the creation of new approaches and methodologies for system composition and operation. To answer these challenges, unified framework 500 establishes a common language to facilitate research of image analysis, recognition, and forensic methods, as applied to the processing of identity documents.

The disclosed unified framework 500 for analysis of identity documents is applicable to different types of image capture (e.g., photograph, video, etc.) with their differing characteristics, and is scalable in terms of both the range of supportable document types and the range of information that can be extracted from those document types. The separation of specific components of unified framework 500, such as document location and identification (block F2), zone extraction (block T1), zone processing (block T3), object processing (block T6), and the like, is intentional and facilitates access to as much information as possible at the level of analysis of each single component of an identity document. Unified framework 500 enables the use of more specialized recognition methods, without restricting the usage of more generalized recognition methods, and enables the construction of systems with the capacity to perform deep forensic analysis of the input image, document substrate, and/or visual components of the document. Preliminary document location and identification (block F2) is especially useful for performing meaningful document validity and authenticity checks, since, in real-world capture conditions, the sensitive security details of identity documents can only be robustly and reliably analyzed after their precise locations, with respect to the documents, have been determined.

Unified framework 500 has been primarily described with respect to identity-document templates with mostly fixed layouts. However, some types of identity documents may not have fixed layouts due to variations in their subtypes or field positions. Unified framework 500 can be used to describe and process such document types, for example, by specifying the definition of a document template with richer template features, such as using static text guides.

One important aspect of unified framework 500 is the ability to analyze a video and process sequences of image frames in the video. When the target is an identity document, processing of a video enhances the reliability and improves the accuracy of the recognition result, and enables specific analysis of the scene in order to detect fraudulent identification attempts and detect and analyze highlights, reflection patterns, and optically variable devices (e.g., holograms). To apply identity-document analysis systems to remote identification processes, the analysis of video becomes crucial, even in implementations in which the recognition process does not accumulate the per-frame information.

Advantageously, unified framework 500 can serve as a basis for developing methodologies, approaches, and new algorithms for identity-document processing and automated personal identification, while addressing the technical and industrial challenges imposed by the utilization of identity-document recognition systems in real-world scenarios, such as identity-document forensics, fully automated personal authentication, and fraud prevention.

5. REFERENCES

Many of the following references have been referred to herein, and all of the following references are incorporated herein by reference as if set forth and full:

Ref1: Eikvil, "OCR—Optical Character Recognition," 1993.

Ref2: Doermann et al., "Handbook of Document Image Processing and Recognition," London: Springer, 2014, 1st edition, DOI:10.1007/978-0-85729-859-1.

Ref3: International Civil Aviation Organization, "ICAO Doc 9303—Machine Readable Travel Documents."

Ref4: Hartl et al., "Real-time detection and recognition of machine-readable zones with mobile devices," in Proceedings of the 10th International Conference on Computer Vision Theory and Applications, Volume 1: VISAPP, 2015, pp. 79-87, DOI:10.5220/0005294700790087.

Ref5: Avoine et al., "ePassport: Securing International Contacts with Contactless Chips," in Financial Cryptography and Data Security, Springer Berlin Heidelberg, 2008, pp. 141-155, DOI:10.1007/978-3-540-85230-8_11.

Ref6: Buchmann et al., "A preliminary study on the feasibility of storing fingerprint and iris image data in 2D-barcodes," in 2016 International Conference of the Biometrics Special Interest Group (BIOSIG), 2016, pp. 1-5, DOI:10.1109/BIOSIG.2016.7736904.

Ref7: Agrawal, "Aadhaar Enabled Applications," 2015.

Ref8: International Organization for Standardization, "ISO/IEC 7810:2003: Identification cards—Physical characteristics," 2003.

Ref9: Council of the European Union, "PRADO—Public Register of Authentic identity and travel Documents Online."

Ref10: American Association of Motor Vehicle Administrators, "AAMVA DL/ID Card Design Standard (CDS)."

Ref11: International Civil Aviation Organization, "Traveller Identification Programme—ID management solutions for more secure travel documents."

Ref12: Jumio, "Global Coverage for Identity Verification."

Ref13: Onfido, "Supported Documents."

Ref14: Keesing Technologies, "Unrivaled coverage of international ID documents."

Ref15: Llados et al., "ICAR: Identity card automatic reader," in Proceedings of Sixth International Conference on Document Analysis and Recognition, 2001, pp. 470-474, DOI: 10.1109/ICDAR.2001.953834.

Ref16: Mollah et al., "Design of an optical character recognition system for camera-based handheld devices," Int'l J. of Computer Science Issues, vol. 8, no. 4, pp. 283-289, 2011.

Ref17: Ryan et al., "An examination of character recognition on id card using template matching approach," Procedia Computer Science, vol. 59, pp. 520-529, 2015, DOI: 10.1016/j.procs.2015.07.534.

Ref18: Pratama et al., "Indonesian ID card recognition using convolutional neural networks," in 2018 5th International Conference on Electrical Engineering, Computer Science and Informatics (EECSI), 2018, pp. 178-181, DOI: 10.1109/EECSI.2018.8752769.

Ref19: Satyawan et al., "Citizen ID card detection using image processing and optical character recognition," Journal of Physics: Conference Series, vol. 1235, p. 012049, 2019, DOI:10.1088/1742-6596/1235/1/012049.

Ref20: Smith, "An Overview of the Tesseract OCR Engine," in Ninth International Conference on Document Analysis and Recognition (ICDAR 2007), vol. 2, 2007, pp. 629-633, DOI:10.1109/ICDAR.2007.4376991.

Ref21: Attivissimo et al., "An automatic reader of identity documents," in 2019 IEEE International Conference on Systems, Man and Cybernetics (SMC). IEEE Press, 2019, pp. 3525-3530, DOI:10.1109/SMC.2019.8914438.

Ref22: Viet et al., "A robust end-to-end information extraction system for Vietnamese identity cards," in 2019 6th NAFOSTED Conference on Information and Computer Science (NICS), 2019, pp. 483-488, DOI:10.1109/NICS48868.2019.9023853.

Ref23: Thanh et al., "A method for segmentation of Vietnamese identification card text fields," International Journal of Advanced Computer Science and Applications, vol. 10, no. 10, 2019, DOI:10.14569/IJACSA.2019.0101057.

Ref24: Sandler et al., "Mobilenetv2: Inverted residuals and linear bottlenecks," in 2018 IEEE/CVF Conference on Computer Vision and Pattern Recognition, 2018, pp. 4510-4520, DOI: 10.1109/CVPR.2018.00474.

Ref25: Guo et al., "Attention OCR," 2017, Accessed Mar. 4, 2021.

Ref26: Xu et al., "A system to localize and recognize texts in oriented ID card images," in 2018 IEEE International Conference on Progress in Informatics and Computing (PIC), 2018, pp. 149-153, DOI:10.1109/PIC.2018.8706303.

Ref27: Wu et al., "Identity authentication on mobile devices using face verification and ID image recognition," Procedia Computer Science, vol. 162, pp. 932-939, 2019, DOI:10.1016/j.procs.2019.12.070.

Ref28: Fang et al., "ID card identification system based on image recognition," in 2017 12th IEEE Conference on Industrial Electronics and Applications (ICIEA), 2017, pp. 1488-1492, DOI:10.1109/ICIEA.2017.8283074.

Ref29: Castelblanco et al., "Machine learning techniques for identity document verification in uncontrolled environments: A case study," in Pattern Recognition, 2020, pp. 271-281, DOI:10.1007/978-3-030-49076-8_26.

Ref30: Arlazarov et al., "MIDV-500: a dataset for identity document analysis and recognition on mobile devices in video stream," Computer Optics, vol. 43, pp. 818-824, October 2019, DOI:10.18287/2412-6179-2019-43-5-818-824.

Ref31: Bulatov et al., "MIDV-2019: challenges of the modern mobile-based document OCR," in Twelfth International Conference on Machine Vision (ICMV 2019), vol. 11433. SPIE, January 2020, pp. 717-722, DOI:10.1117/12.2558438.

Ref32; Skoryukina et al., "Fast method of id documents location and type identification for mobile and server application," in 2019 International Conference on Document Analysis and Recognition (ICDAR), 2019, pp. 850-857, DOI:10.1109/ICDAR.2019.00141.

Ref33: Soares et al., "BID Dataset: a challenge dataset for document processing tasks," in Anais Estendidos do XXXIII Conference on Graphics, Patterns and Images, 2020, pp. 143-146, DOI:10.5753/sibgrapi.est.2020.12997.

Ref34: Ngoc et al., "Saliency-based detection of identity documents captured by smartphones," in 2018 13th IAPR International Workshop on Document Analysis Systems (DAS), 2018, pp. 387-392, DOI:10.1109/DAS.2018.17.

Ref35: Chazalon et al., "SmartDoc 2017 Video Capture: Mobile Document Acquisition in Video Mode," in 2017 14th IAPR International Conference on Document Analysis and Recognition (ICDAR), vol. 04, 2017, pp. 11-16, DOI:10.1109/ICDAR.2017.306.

Ref36: Sencar et al., "Overview of State-of-the-Art in Digital Image Forensics," World Scientific, 2008, pp. 325-347, DOI:10.1142/9789812836243 0015.

Ref37: Piva, "An overview on image forensics," ISRN Signal Processing, vol. 2013, pp. 68-73, 2013, DOI:10.1155/2013/496701.

Ref38: Centeno et al., "Identity Document and banknote security forensics: a survey," arXiv:1910.08993, 2019.

Ref39: Ferreira et al., "A review of digital image forensics," Computers & Electrical Engineering, vol. 85, p. 106685, 2020, DOI:10.1016/j.compeleceng.2020.106685.

Ref40: Council of the European Union, "PRADO Glossary—Technical terms related to security features and to security documents in general (in alphabetical order)," 2021.

Ref41: U.S. patent Ser. No. 10/354,142B2.

Ref42: Kunina et al., "A method of fluorescent fibers detection on identity documents under ultraviolet light," in ICMV 2019, vol. 11433, no. 11433 OD, SPIE, 2020, pp. 1-8, DOI:10.1117/12.2558080.

Ref43: Li et al., "Image recapture detection with convolutional and recurrent neural networks," Electronic Imaging, vol. 2017, no. 7, pp. 87-91, 2017, DOI: 10.2352/ISSN.2470-1173 0.2017.7.MWSF-329.

Ref44: Sun et al., "Recaptured image forensics algorithm based on image texture feature," International Journal of Pattern Recognition and Artificial Intelligence, vol. 34, no. 03, 2020, DOI:10.1142/50218001420540117, Article ID 2054011.

Ref45: Warbhe et al., "A scaling robust copypaste tampering detection for digital image forensics," Procedia Computer Science, vol. 79, pp. 458-465, 2016, Proceedings of International Conference on Communication, Computing and Virtualization (ICCCV) 2016, DOI:10.1016/j.procs.2016.03.059.

Ref46: Yusoff et al., "Implementation of feature extraction algorithms for image tampering detection," International Journal of Advanced Computer Research, vol. 9, no. 43, pp. 197-211, 2019, DOI:10.19101/IJACR.PID37.

Ref47: Kumar et al., "Image forensics based on lighting estimation," International Journal of Image and Graphics, vol. 19, no. 03, 2019, DOI:10.1142/50219467819500141, Article ID 1950014.

Ref48: International Organization for Standardization, "ISO 1073-2:1976: Alphanumeric character sets for optical recognition—Part 2: Character set OCR-B—Shapes and dimensions of the printed image," 1976.

Ref49: Starovoitov et al., "Matching of faces in camera images and document photographs," in 2000 IEEE International Conference on Acoustics, Speech, and Signal Processing, Proceedings (Cat. No.00CH37100), vol. 4, 2000, pp. 2349-2352, vol. 4, DOI:10.1109/ICASSP.2000.859312.

Ref50: Fysh et al., "Forensic face matching: A review," in Face processing: Systems, Disorders and Cultural Differences, New York: Nova Science Publishing, Inc., August 2017, pp. 1-20.

Ref51: Bulatov et al., "Smart IDReader: Document recognition in video stream," in 14th International Conference on Document Analysis and Recognition (ICDAR), vol. 6. IEEE, 2017, pp. 39-44, DOI:10.1109/ICDAR.2017.347.

Ref52: Valentin et al., "Optical benchmarking of security document readers for automated border control," in Optics and Photonics for Counterterrorism, Crime Fighting, and Defence XII, vol. 9995, International Society for Optics and Photonics, SPIE, 2016, pp. 20-30, DOI:10.1117/12.2241169.

Ref53: "Fujitsu fi-65F: Flatbed scanner for passports, ID cards," Spigraph catalogue.

Ref54: "PS667 Simplex ID Card Scanner with AmbirScan," Ambir Technology.

Ref55: Japanese Patent No. 6314332B2.

Ref56: Russian Patent No. 182557U1.

Ref57: Russian Patent No. 127977U1.

Ref58: Arlazarov et al., "Analysis of the usage specifics of stationary and small-scale mobile video cameras for documents recognition," Information Technologies and Computing Systems (ITiVS), no. 3, pp. 71-81, 2014.

Ref59: Li et al., "Document rectification and illumination correction using a patch-based CNN," ACM Trans. Graph., vol. 38, no. 6, 2019, DOI:10.1145/3355089.3356563, Art. No. 168.

Ref60: Asad et al., "High performance OCR for camera-captured blurred documents with LSTM networks," in 2016 12th IAPR Workshop on Document Analysis Systems (DAS), 2016, pp. 7-12, DOI:10.1109/DAS.2016.69.

Ref61: Chernov et al., "Image quality assessment for video stream recognition systems," in ICMV 2017, vol. 10696, no. 106961U, SPIE, April 2018, pp. 1-8, DOI:10.1117/12.2309628.

Ref62: Nunnagoppula et al., "Automatic blur detection in mobile captured document images: Towards quality check in mobile based document imaging applications," in 2013 IEEE Second International Conference on Image Information Processing (ICIIP-2013), 2013, pp. 299-304, DOI:10.1109/ICIIP.2013 0.6707602.

Ref63: Miao et al., "Perspective rectification of document images based on morphology," in 2006 International Conference on Computational Intelligence and Security, vol. 2, 2006, pp. 1805-1808, DOI:10.1109/ICCIAS.2006.295374.

Ref64: Takezawa et al., "Robust perspective rectification of camera-captured document images," in 2017 14th IAPR International Conference on Document Analysis and Recognition (ICDAR), vol. 06, 2017, pp. 27-32, DOI:10.1109/ICDAR.2017.345.

Ref65: Kunina et al., "Blind radial distortion compensation in a single image using fast Hough transform," Computer Optics, vol. 40, no. 3, pp. 395-403, 2016, DOI:10.18287/2412-6179-2016-40-3-395-403.

Ref66: Zhukovsky et al., "Segments graph-based approach for document capture in a smartphone video stream," in 2017 14th IAPR International Conference on Document Analysis and Recognition (ICDAR), vol. 01, 2017, pp. 337-342, DOI:10.1109/ICDAR.2017.63.

Ref67: Haris et al., "Recurrent back-projection network for video super-resolution," in 2019 IEEE/CVF Conference on Computer Vision and Pattern Recognition (CVPR), 2019, pp. 3892-3901, DOI:10.1109/CVPR.2019.00402.

Ref68: Petrova et al., "Weighted combination of per-frame recognition results for text recognition in a video stream," Computer Optics, vol. 45, no. 1, pp. 77-89, 2021, DOI: 10.18287/2412-6179-CO-795.

Ref69: Awal et al., "Complex document classification and localization application on identity document images," in 2017 14th IAPR International Conference on Document Analysis and Recognition (ICDAR), vol. 01, 2017, pp. 426-431, DOI:10.1109/ICDAR.2017.77.

Ref70: Augereau et al., "Semi-structured document image matching and recognition," in Document Recognition and Retrieval XX, vol. 8658, International Society for Optics and Photonics. SPIE, 2013, pp. 13-24, DOI:10.1117/12.2003911.

Ref71: Slavin, "Using Special Text Points in the Recognition of Documents," Cham: Springer International Publishing, 2020, pp. 43-53, DOI:10.1007/978-3-030-32579-4 4.

Ref72: Minkina et al., "Generalization of the Viola-Jones method as a decision tree of strong classifiers for realtime object recognition in video stream," in ICMV 2014, A. V. B. V. P. R. J. Zhou, Ed., vol. 9445, no. 944517, SPIE, 2015, pp. 1-5, DOI:10.1117/12.2180941.

Ref73: Puybareau et al., "Real-time document detection in smartphone videos," in 2018 25th IEEE International Conference on Image Processing (ICIP), 2018, pp. 1498-1502, DOI:10.1109/ICIP.2018.8451533.

Ref74: das Neves Junior et al., "HU-PageScan: a fully convolutional neural network for document page crop," IET Image Processing, vol. 14, pp. 3890-3898, 2020, DOI: 10.1049/iet-ipr.2020.0532.

Ref75: Loc et al., "Content region detection and feature adjustment for securing genuine documents," in 2020 12th International Conference on Knowledge and Systems Engineering (KSE), 2020, pp. 103-108, DOI: 10.1109/KSE50997.2020.9287382.

Ref76: Forman et al., "Secure similar document detection: Optimized computation using the jaccard coefficient," in 2018 IEEE 4th International Conference on Big Data Security on Cloud (BigDataSecurity), IEEE International Conference on High Performance and Smart Computing, (HPSC) and IEEE International Conference on Intelligent Data and Security (IDS), 2018, pp. 1-4, DOI: 10.1109/BDS/HPSC/IDS18.2018.00015.

Ref77: Skoryukina et al., "Real time rectangular document detection on mobile devices," in ICMV 2014, A. V. B. V. P. R. J. Zhou, Ed., vol. 9445, no. 94452A, SPIE, February 2015, pp. 1-6, DOI:10.1117/12.2181377.

Ref78: Bulatov et al., "On optimal stopping strategies for text recognition in a video stream as an application of a monotone sequential decision model," International Journal on Document Analysis and Recognition, vol. 22, no. 3, pp. 303-314, 2019, DOI:10.1007/s10032-019-00333-0.

Ref79: Povolotskiy et al., "Dynamic Programming Approach to Template-based OCR," in ICMV 2018, vol. 11041, no. 110411T, SPIE, 2019, DOI:10.1117/12.2522974.

Ref80: Zhou et al., "EAST: An efficient and accurate scene text detector," in 2017 IEEE Conference on Computer Vision and Pattern Recognition (CVPR), 2017, pp. 2642-2651, DOI:10.1109/CVPR.2017.283.

Ref81: Wolf et al., "Object count/area graphs for the evaluation of object detection and segmentation algorithms," Int. J. Doc. Anal. Recognit., vol. 8, no. 4, pp. 280-296, 2006.

Ref82: Lee et al., "Tedeval: A fair evaluation metric for scene text detectors," arXiv:1907.01227, 2019.

Ref83: Baek et al., "CLEval: Character-Level Evaluation for Text Detection and Recognition Tasks," arXiv:2006.06244, 2020.

Ref84: Bezmaternykh et al., "Textual blocks rectification method based on fast Hough transform analysis in identity documents recognition," in ICMV 2017, vol. 10696, no. 1069606, SPIE, 2018, pp. 1-6, DOI:10.1117/12.2310162.

Ref85: Chernyshova et al., "Two-step CNN framework for text line recognition in camera-captured images," IEEE Access, vol. 8, pp. 32 587-32 600, 2020, DOI: 10.1109/ACCESS.2020.2974051.

Ref86: Bulatov, "A method to reduce errors of string recognition based on combination of several recognition results with per-character alternatives," Bulletin of the South Ural State University, Series: Mathematical Modelling, Programming and Computer Software, vol. 12, no. 3, pp. 74-88, 2019, DOI:10.14529/mmp190307.
Ref87: Yujian et al., "A normalized levenshtein distance metric," IEEE Transactions on Pattern Analysis and Machine Intelligence, vol. 29, no. 6, pp. 1091-1095, 2007, DOI:10.1109/TPAMI.2007.1078.
Ref88: Fiscus, "A post-processing system to yield reduced word error rates: Recognizer Output Voting Error Reduction (ROVER)," in IEEEWorkshop on Automatic Speech Recognition and Understanding, 1997, pp. 347-354, DOI: 10.1109/ASRU.1997.659110.
Ref89: Arlazarov et al., "Method of determining the necessary number of observations for video stream documents recognition," in Proc. SPIE (ICMV 2017), vol. 10696, 2018, DOI:10.1117/12.2310132.
Ref90: Tolstoy et al., "A modification of a stopping method for text recognition in a video stream with best frame selection," in ICMV 2020, vol. 11605, no. 116051M, SPIE, 2021, pp. 1-9, DOI:10.1117/12.2586928.
Ref91: Polevoy et al., "Choosing the best image of the document owner's photograph in the video stream on the mobile device," in ICMV 2020, vol. 11605, no. 11605 OF, SPIE, 2021, pp. 1-9, DOI:10.1117/12.2586939.
Ref92: Shi et al., "Real-time single image and video super-resolution using an efficient sub-pixel convolutional neural network," in 2016 IEEE Conference on Computer Vision and Pattern Recognition (CVPR), 2016, pp. 1874-1883, DOI:10.1109/CVPR.2016.207.
Ref93: Ren et al., "Video super resolution based on deep convolution neural network with two-stage motion compensation," in 2018 IEEE International Conference on Multimedia Expo Workshops (ICMEW), 2018, pp. 1-6, DOI:10.1109/ICMEW.2018.8551569.
Ref94: Mei et al., "Statistical Learning for OCR Text Correction," arXiv:1611.06950, 2016.
Ref95: Nguyen et al., "Post-OCR error detection by generating plausible candidates," in 2019 International Conference on Document Analysis and Recognition (ICDAR), 2019, pp. 876-881, DOI:10.1109/ICDAR.2019.00145.
Ref96: Llobet et al., "OCR post-processing using weighted finite-state transducers," in 20th International Conference on Pattern Recognition, 2010, pp. 2021-2024, DOI: 10.1109/ICPR.2010.498.
Ref97: Bulatov et al., "Universal algorithm for post-processing of recognition results based on validation grammars," Trudy ISA RAN, vol. 65, no. 4, pp. 68-73, 2015.
Ref98: Petrova et al., "Methods of machine-readable zone recognition results post-processing," in ICMV 2018, vol. 11041, no. 110411H, SPIE, 2019, DOI:10.1117/12.2522792.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
- in each of a plurality of iterations of a document-recognition session,
  - receive an image from a sequence of multiple input images captured from the same physical document,
  - locate the document in the image and attempt to identify one or more of a plurality of templates that match the document,
  - when one or more templates that match the document are identified, for each of the one or more templates,
    - for each of a plurality of zones in the template, determine whether any of the plurality of zones in the template satisfy a zone-level stopping condition in which all objects in the zone have satisfied an object-level stopping condition, extract a sub-image of the zone from the image that has not satisfied the zone-level stopping condition, and skip a zone that has satisfied the zone-level stopping condition in one or more prior iterations,
    - for each extracted sub-image, extract one or more objects from the sub-image of the zone that has not satisfied the object-level stopping condition, and skip an object that has satisfied the object-level stopping condition in one or more prior iterations, and,
    - for each extracted object, perform object recognition on the object, and
  - perform document recognition based on the one or more templates and results of the object recognition performed for each extracted object;
  - accumulate, in non-persistent storage of the document-recognition session, a result of the document recognition performed in the iteration with a result of the document recognition performed in one or more prior iterations, and
- output a final result based on the accumulated result of the document recognition in the plurality of iterations.

2. The method of claim 1, wherein each of the one or more templates that is identified as matching the document is associated with a template recognition configuration and one or more geometric parameters representing one or more boundaries, within the image, of the document to which the template was matched, and wherein the method further comprises using the at least one hardware processor to, for each of the one or more templates, retrieve the associated template recognition configuration from a persistent data storage.

3. The method of claim 2, wherein each template recognition configuration defines the plurality of zones in the template, and, for each of the plurality of zones, defines the one or more objects within that zone.

4. The method of claim 1, further comprising using the at least one hardware processor to, for each of the one or more templates, for each extracted sub-image, process the sub-image prior to extracting the one or more objects from the sub-image.

5. The method of claim 4, wherein processing the sub-image comprises correcting one or more geometric distortions.

6. The method of claim 1, further comprising using the at least one hardware processor to, for each of the one or more templates, for each extracted object, process the object prior to performing object recognition on the object.

7. The method of claim 1, further comprising using the at least one hardware processor to add another iteration to the plurality of iterations until a recognition-level stopping condition is satisfied.

8. The method of claim 1, further comprising using the at least one hardware processor to, in each of the plurality of iterations, when one or more templates that match the document are identified in the frame, for each of the one or more templates, for at least one extracted object on which object recognition is performed, integrate a result of the object recognition performed for that object in the iteration with a result of the object recognition performed for that object in one or more prior iterations.

9. The method of claim 1, wherein at least one object represents an optically variable device.

10. The method of claim 1, wherein at least one object represents a text field.

11. The method of claim 1, wherein at least one object represents a photograph of a human face.

12. The method of claim 1, further comprising using the at least one hardware processor to verify an authenticity of the document based on the final result.

13. The method of claim 1, further comprising using the at least one hardware processor to verify an identity of a person, represented in the document, based on the final result.

14. The method of claim 1, wherein extracting one or more objects from the sub-image comprises segmenting the sub-image into the one or more objects according to a segmentation method.

15. The method of claim 14, wherein at least one of the one or more templates comprises at least a first zone and a second zone, wherein the first zone is associated with a first segmentation method such that segmenting the sub-image of the first zone is performed according to the first segmentation method, wherein the second zone is associated with a second segmentation method such that segmenting the sub-image of the second zone is performed according to the second segmentation method, and wherein the second segmentation method is different from the first segmentation method.

16. The method of claim 1, further comprising using the at least one hardware processor to:
determine whether an input mode is a scanned image, photograph, or video;
when the input mode is determined to be a scanned image or photograph, perform only a single iteration as the at least one iteration; and,
when the input mode is determined to be a video, perform a plurality of iterations as the at least one iteration.

17. A system comprising:
at least one hardware processor; and
one or more software modules that are configured to, when executed by the at least one hardware processor,
in each of a plurality of iterations of a document-recognition session,
receive an image from a sequence of multiple input images captured from the same physical document,
locate the document in the image and attempt to identify one or more of a plurality of templates that match the document,
when one or more templates that match the document are identified, for each of the one or more templates,
for each of a plurality of zones in the template, determine whether any of the plurality of zones in the template satisfy a zone-level stopping condition in which all objects in the zone have satisfied an object-level stopping condition, extract a sub-image of the zone from the image that has not satisfied the zone-level stopping condition, and skip a zone that has satisfied the zone-level stopping condition in one or more prior iterations,
for each extracted sub-image, extract one or more objects from the sub-image of the zone that has not satisfied the object-level stopping condition, and skip an object that has satisfied the object-level stopping condition in one or more prior iterations, and,
for each extracted object, perform object recognition on the object, and perform document recognition based on the one or more templates and results of the object recognition performed for each extracted object;
accumulate, in non-persistent storage of the document-recognition session, a result of the document recognition performed in the iteration with a result of the document recognition performed in one or more prior iterations, and
output a final result based on the accumulated result of the document recognition in the plurality of iterations.

18. A non-transitory computer-readable medium having instructions stored therein, wherein the instructions, when executed by a processor, cause the processor to:
in each of a plurality of iterations of a document-recognition session,
receive an image from a sequence of multiple input images captured from the same physical document,
locate the document in the image and attempt to identify one or more of a plurality of templates that match the document,
when one or more templates that match the document are identified, for each of the one or more templates,
for each of a plurality of zones in the template, determine whether any of the plurality of zones in the template satisfy a zone-level stopping condition in which all objects in the zone have satisfied an object-level stopping condition, extract a sub-image of the zone from the image that has not satisfied the zone-level stopping condition, and skip a zone that has satisfied the zone-level stopping condition in one or more prior iterations,
for each extracted sub-image, extract one or more objects from the sub-image of the zone that has not satisfied the object-level stopping condition, and skip an object that has satisfied the object-level stopping condition in one or more prior iterations, and,
for each extracted object, perform object recognition on the object, and perform document recognition based on the one or more templates and results of the object recognition performed for each extracted object;

accumulate, in non-persistent storage of the document-recognition session, a result of the document recognition performed in the iteration with a result of the document recognition performed in one or more prior iterations, and output a final result based on the accumulated result of the document recognition in the plurality of iterations.

* * * * *